United States Patent
Sharma et al.

(10) Patent No.: US 11,680,786 B2
(45) Date of Patent: Jun. 20, 2023

(54) CAPACITIVE POSITION SENSING FOR CAMERA FOCUS MANAGEMENT

(71) Applicant: Waymo LLC, Mountain View, CA (US)

(72) Inventors: Shashank Sharma, Mountain View, CA (US); Matthew Last, San Jose, CA (US); Prasanna Kalkura, San Jose, CA (US); Paul Schaefer, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/453,748

(22) Filed: Nov. 5, 2021

(65) Prior Publication Data
US 2023/0148358 A1    May 11, 2023

(51) Int. Cl.
*G02B 7/10* (2021.01)
*G01B 7/00* (2006.01)
(Continued)

(52) U.S. Cl.
CPC ............. *G01B 7/003* (2013.01); *G02B 7/102* (2013.01); *H04N 23/55* (2023.01); *H04N 23/67* (2023.01)

(58) Field of Classification Search
CPC ...... G01B 7/003; G02B 7/102; H04N 5/2254; H04N 5/23212
See application file for complete search history.

(56) References Cited

U.S. PATENT DOCUMENTS

| 5,101,278 A | 3/1992 | Itsumi et al. |
| 7,529,476 B2 | 5/2009 | Kurosawa |

(Continued)

FOREIGN PATENT DOCUMENTS

| CN | 104717434 | 6/2015 |
| KR | 20160006435 | 1/2016 |

(Continued)

OTHER PUBLICATIONS

Blahnik et al., "Smartphone imaging technology and its applications," Adv. Opt. Techn., 2021, pp. 145-232, vol. 10, No. 3.
(Continued)

*Primary Examiner* — Mekonnen D Dagnew
(74) *Attorney, Agent, or Firm* — McDonnell Boehnen Hulbert & Berghoff LLP

(57) ABSTRACT

An apparatus includes a lens assembly that includes at least one lens that defines an optical axis. The apparatus also includes a substrate, an image sensor disposed on the substrate, and an actuator coupled to the substrate and configured to adjust a position of the substrate relative to the lens assembly to move the image sensor along the optical axis. The apparatus additionally includes a capacitive position sensor that includes a first capacitive plate coupled to the substrate and a second capacitive plate coupled to the lens assembly. The capacitive position sensor may be configured to generate a capacitance measurement indicative of the position of the substrate relative to the lens assembly. The apparatus further includes circuitry configured to control the actuator based on (i) the capacitance measurement and (ii) a target position of the image sensor relative to the lens assembly.

20 Claims, 11 Drawing Sheets

(51) Int. Cl.
*H04N 23/55* (2023.01)
*H04N 23/67* (2023.01)

(56) References Cited

U.S. PATENT DOCUMENTS

| | | | |
|---|---|---|---|
| 8,098,289 B2 | 1/2012 | Chiou et al. | |
| 8,284,297 B2 | 10/2012 | Chou | |
| 8,994,298 B2 | 3/2015 | Inaji et al. | |
| 9,376,066 B2 | 6/2016 | Lu | |
| 9,578,217 B2 | 2/2017 | Gutierrez et al. | |
| 9,621,769 B2 | 4/2017 | Mai et al. | |
| 9,736,345 B1* | 8/2017 | Topliss | H04N 5/23212 |
| 9,807,286 B2 | 10/2017 | Kim | |
| 9,917,991 B2 | 3/2018 | Topliss | |
| 10,136,040 B2 | 11/2018 | Topliss et al. | |
| 10,257,933 B1 | 4/2019 | Hassemer et al. | |
| 10,965,848 B1 | 3/2021 | Ba-Tis | |
| 2008/0000304 A1* | 1/2008 | Nagle | G01B 7/003 |
| | | | 73/780 |
| 2008/0079829 A1 | 4/2008 | Choi et al. | |
| 2008/0237443 A1 | 10/2008 | Oliver et al. | |
| 2008/0284860 A1 | 11/2008 | Wu et al. | |
| 2009/0059465 A1* | 3/2009 | Liu | H01G 5/16 |
| | | | 361/292 |
| 2009/0180202 A1 | 7/2009 | Knoedgen | |
| 2011/0285890 A1 | 11/2011 | Choi et al. | |
| 2013/0194466 A1 | 8/2013 | Cheng et al. | |
| 2014/0184899 A1 | 7/2014 | McKinley | |
| 2015/0192750 A1 | 7/2015 | Shiraishi | |
| 2015/0286330 A1 | 10/2015 | Shepelev et al. | |
| 2018/0100953 A1 | 4/2018 | Aschwanden et al. | |
| 2018/0171991 A1 | 6/2018 | Miller et al. | |
| 2019/0028620 A1 | 1/2019 | Park | |
| 2019/0289218 A1 | 9/2019 | Liu | |
| 2020/0393691 A1 | 12/2020 | Owens et al. | |
| 2021/0132327 A1 | 5/2021 | Sharma et al. | |

FOREIGN PATENT DOCUMENTS

| | | |
|---|---|---|
| KR | 102169418 | 10/2020 |
| WO | 2014/074250 | 5/2014 |
| WO | 2021/040397 | 3/2021 |

OTHER PUBLICATIONS

Galaom, Ahmed Abdurabu Nasser, "Integrationof a MEMS-based Autofocus Actuator into a Smartphone Camera," Thesis—Mechanical and Industrial Engineering, University of Toronto, 2016, 123 pages.

La Rosa et al., "Optical Image Stabilization (OIS)," https://www.stmicroelectronics.com.cn/content/ccc/resource/technical/document/white_paper/c9/a6/fd/e4/e6/4e/48/60/ois_white_paper.pdf/files/ois_white_paper.pdf/jcr:content/translations/en.ois_white_paper.pdf, 2015, 26 pages.

Sharma et al., U.S. Appl. No. 16/702,054, filed Dec. 3, 2019.

International Searching Authority, International Search Report and Written Opinion dated Mar. 2, 2023, issued in connection with International Patent Application No. PCT/US2020/078961 filed on Oct. 31, 2022, 10 pages.

\* cited by examiner

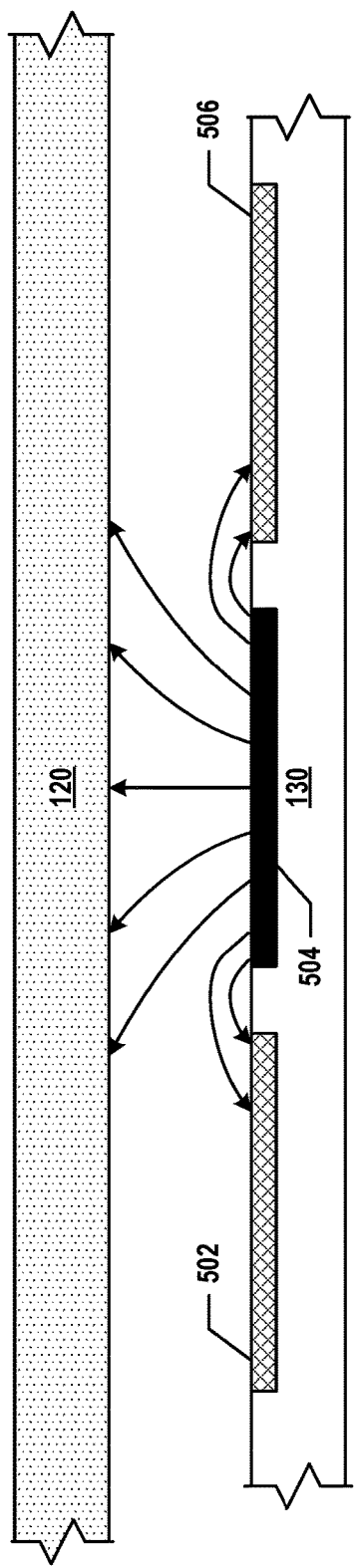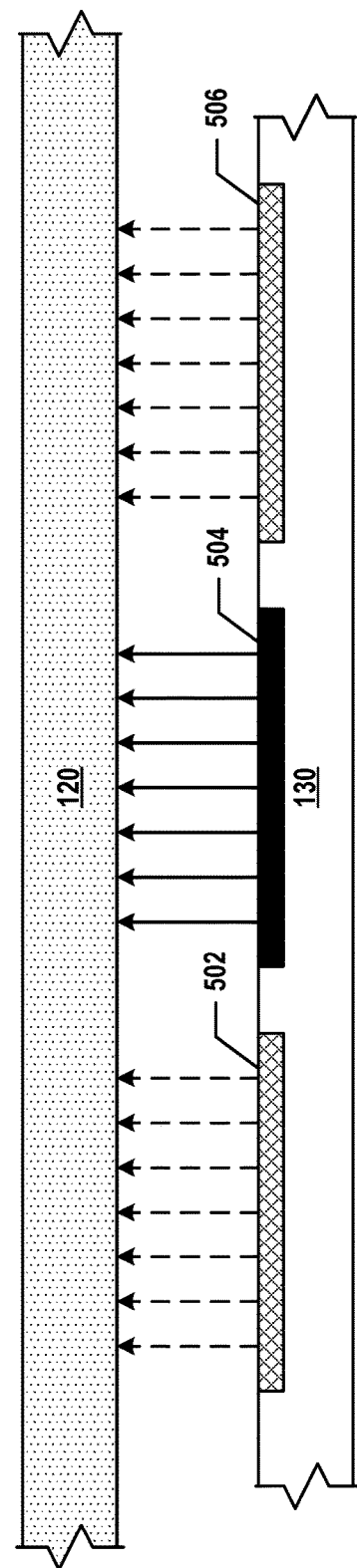

CAPACITIVE POSITION SENSING FOR CAMERA FOCUS MANAGEMENT

BACKGROUND

An optical system may include one or more lenses and an image sensor. The image sensor may include a plurality of light-sensing pixels that measure an intensity of light incident thereon and thereby collectively capture an image of an environment. A Bayer filter may be applied to the image sensor to allow the image sensor to generate color images of the environment. Optical systems may be used in a plurality of applications such as photography, robotics, and autonomous and/or semi-autonomous vehicles that are configured to operate in one or more driving modes, such as fully autonomous mode or partially autonomous mode (e.g., driver assistance, adaptive cruise control, etc.).

SUMMARY

An optical system may include an actuator configured to reposition an image sensor relative to an optical axis of one or more lenses. The image sensor may be repositioned, for example, to maintain the image sensor within a depth of focus of the one or more lenses. The actuator may allow the optical system to compensate for changes in positioning of the image sensor relative to the depth of focus caused by temperature variations, mechanical perturbations, and/or component aging, among other factors. A position of the image sensor may be determined using a capacitive position sensor, which may include at least (i) a first capacitive plate coupled to a substrate on which the image sensor is disposed and (ii) a second capacitive plate coupled to a lens assembly that includes the one or more lenses. Variations in relative position between the one or more lenses and the image sensor may generate a corresponding change in capacitance between the first and second capacitive plates, which may be measured and used to determine the position of the image sensor. The optical system may also include circuitry configured to measure the capacitance between at least the first and second capacitive plates, determine the position of the image sensor based on the measured capacitance, and generate a control signal configured to cause the actuator to reposition the image sensor to a target position (e.g., within the depth of focus).

In a first example embodiment, an apparatus may include a lens assembly that includes at least one lens that defines an optical axis. The apparatus may also include a substrate, an image sensor disposed on the substrate, and an actuator coupled to the substrate and configured to adjust a position of the substrate relative to the lens assembly to move the image sensor along the optical axis. The apparatus may additionally include a capacitive position sensor that includes a first capacitive plate coupled to the substrate and a second capacitive plate coupled to the lens assembly. The capacitive position sensor may be configured to generate a capacitance measurement indicative of the position of the substrate relative to the lens assembly. The apparatus may further include circuitry configured to control the actuator based on (i) the capacitance measurement and (ii) a target position of the image sensor relative to the lens assembly.

In a second example embodiment, a method may include receiving, from a capacitive position sensor, a capacitance measurement indicative of a position of a substrate relative to a lens assembly. The lens assembly may include at least one lens that defines an optical axis. An image sensor may be disposed on the substrate. The capacitive position sensor may include a first capacitive plate coupled to the substrate and a second capacitive plate coupled to the lens assembly. The method may also include determining, based on the capacitance measurement and a target position of the image sensor relative to the lens assembly, a control signal for an actuator that is coupled to the substrate and configured to adjust the position of the substrate relative to the lens assembly to move the image sensor along the optical axis. The method may further include providing the control signal to the actuator to move the substrate to the target position.

In a third example embodiment, a system may include a processor and a non-transitory computer-readable medium having stored thereon instructions that, when executed by the processor, cause the processor to perform operations in accordance with the second example embodiment.

In a fourth example embodiment, a non-transitory computer-readable medium may have stored thereon instructions that, when executed by a computing device, cause the computing device to perform operations in accordance with the second example embodiment.

In a fifth example embodiment, a system may include a lens assembly that includes at least one lens that defines an optical axis. The system may also include a substrate, an image sensing means disposed on the substrate, and an actuating means coupled to the substrate and configured to adjust a position of the substrate relative to the lens assembly to move the image sensing means along the optical axis. The system may additionally include a capacitive position sensing means that includes a first capacitive plate means coupled to the substrate and a second capacitive plate means coupled to the lens assembly. The capacitive position sensing means may be configured to generate a capacitance measurement indicative of the position of the substrate relative to the lens assembly. The system may further include means for controlling the actuating means based on (i) the capacitance measurement and (ii) a target position of the image sensing means relative to the lens assembly.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 5A and 5B illustrate an electrode arrangement for a capacitive plate, in accordance with example embodiments.

DETAILED DESCRIPTION

Figure 1:
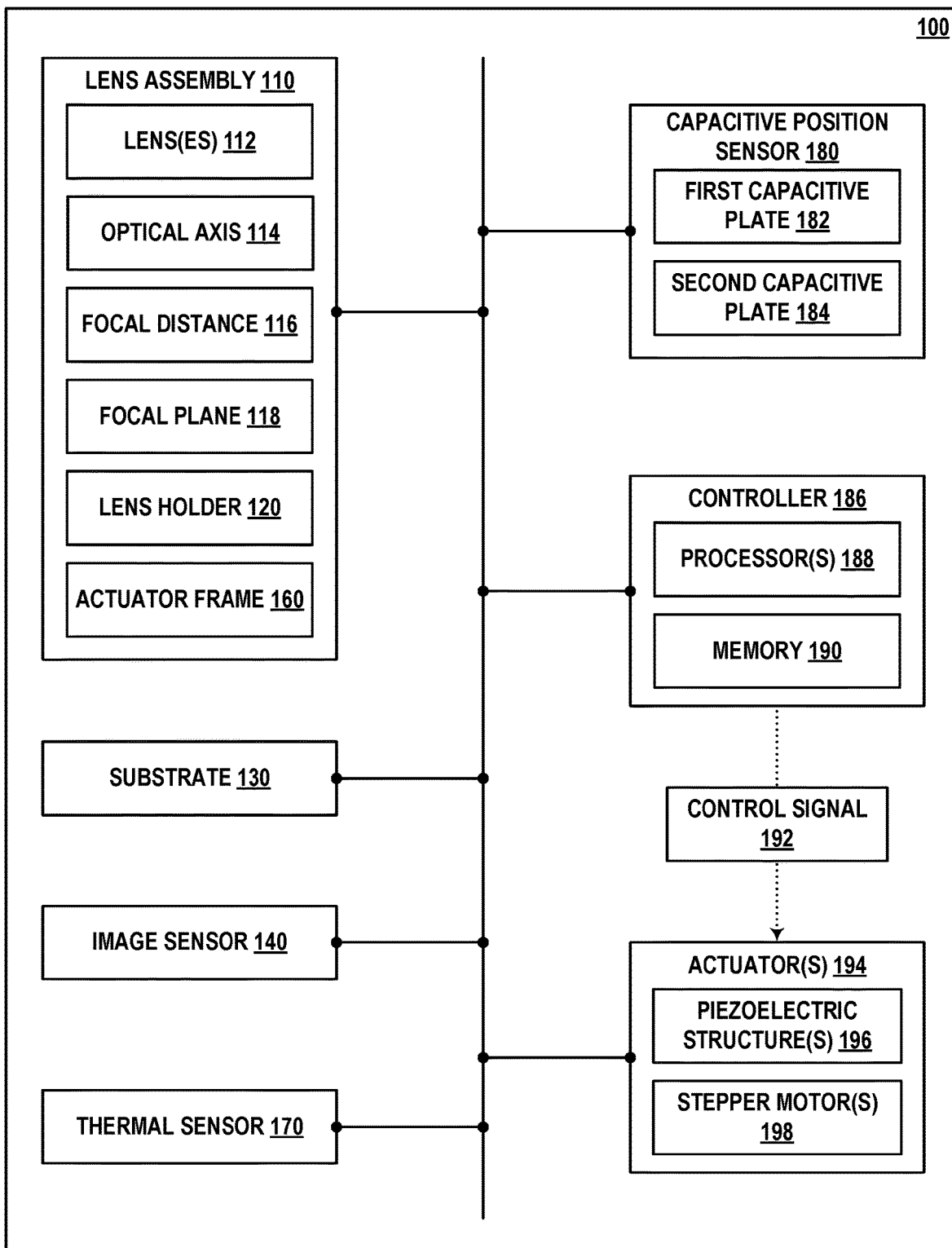
FIG. 1 illustrates a sensor system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A camera device may include an image sensor and a lens assembly. The lens assembly may include one or more lenses that are configured to focus light on the image sensor and a lens holder configured to position the one or more lenses relative to other components of the camera device. The image sensor may be disposed on a substrate, such as a printed circuit board (PCB), which may be positioned relative to the lens assembly. When the relative positioning of the image sensor and the lens is fixed, it may be difficult to maintain the image sensor within a depth of focus of the lens assembly when camera components expand and contract due to changes in operating conditions (e.g., temperature, humidity, mechanical perturbations, component aging, etc.). This may be especially problematic in automotive applications where, in addition to thermal gradients inside the camera, ambient temperatures experienced by the camera may fluctuate between, for example, −30 degrees Celsius and 85 degrees Celsius.

For example, different portions of the camera may expand and contract to different extents due to temperature changes, causing the image sensor to drift in and out of the depth of focus of the lens assembly, resulting in generation of out-of-focus images. The problem may be especially apparent where the image sensor includes a small pixel size (resulting in a smaller image sensor) and/or the lens has a low f-number, resulting in a small or shallow depth of focus (e.g., approximately 10-15 microns). A low depth of focus may limit the maximum extent of warpage of the image sensor that can occur before the generated images are out of focus.

An actuator may be connected between the substrate and the lens holder to allow for adjustments in the position of the image sensor at least along the optical axis of the lens. For example, the actuator may include a stack of one or more linear piezoelectric actuators, a piezoelectric tube actuator, and/or a bending actuator positioned along a plane defined by the substrate. The actuator may shorten, contract, and/or bend in a first direction to move the image sensor in a first direction relative to the lens (e.g., toward the lens), and may lengthen, expand, and/or bend in a second direction to move the image sensor in a second direction relative to the lens (e.g., away from the lens). Additionally or alternatively, the actuator may include an electric motor. Moving the image sensor, rather than the lens, may facilitate sealing of the camera components within a compact housing. Further, since the combined weight of the image sensor and the substrate may be smaller than that of the lens assembly, moving the image sensor and substrate may involve less force than moving the lens.

The camera may also include a position sensor connected to the lens assembly and the substrate and configured to provide position feedback that allows the image sensor to be accurately positioned relative to the one or more lenses. The position sensor may be a capacitive position sensor that includes one or more capacitors. Specifically, a capacitor of the capacitive position sensor may include a first capacitive plate coupled to and/or defined on the substrate and a second capacitive plate coupled to and/or defined by part of the lens assembly. Thus, the capacitance of the capacitor may vary based on a relative position between the substrate and the lens assembly. Accordingly, the capacitive position sensor may be configured to generate a capacitance measurement that indicates the position of the substrate relative to the lens assembly. For example, the capacitance measurement may vary as a function of (e.g., may be inversely proportional to) the position of the substrate.

The capacitive position sensor may be easier to implement as part of the camera than other types of position sensors. In one example, a capacitive plate may be coupled to and/or defined on the substrate using the same or similar processes as other features of the substrate, and may thus be formed by modifying existing manufacturing operations rather than adding additional operations. In another example, a capacitive plate may be defined to be integral with the lens assembly, and may thus be formed by shaping parts of the lens assembly rather than attaching additional components thereto. Additionally, the capacitive position sensor may include arrangements that compensate for variations in temperature, humidity, mechanical perturbations, and/or component aging, thereby allowing the capacitive position sensor to measure the position of the substrate more accurately than other types of position sensors. For example, as discussed below, differential arrangements of the capacitive plates and/or usage of shielding electrodes may improve the position measurement accuracy relative to other types of position sensors and/or arrangements thereof.

In one example, the first capacitive plate may be driven with a voltage (e.g., a time-varying signal), while the second capacitive plate may be held at a fixed voltage (e.g., ground). In some implementations, a reference capacitor that has a known/predetermined capacitance may be used in determining the capacitance measurement. Placement of the first (driven) capacitive plate on the substrate (e.g., a PCB), rather than on the lens assembly, may facilitate the establishment of electrical connections to the capacitive position sensor.

Control circuitry may be configured to determine and/or receive the capacitance measurement, determine a distance between the lens assembly and the image sensor, and control the actuator to adjust the distance to a target distance (e.g., a distance that places the image sensor within the depth of focus of the one or more lenses). The capacitive position sensor may also allow the effects of any hysteresis or nonlinearities in the actuator to be accounted and/or compensated for when repositioning the substrate.

In some implementations, the capacitive position sensor may include two capacitors. A first capacitor may be disposed on a first side (e.g., top side) of the substrate and a second capacitor may be disposed on a second side (e.g., bottom side) of the substrate. For example, the first capacitor may be formed from a first capacitive plate defined on the first side of the substrate and a second capacitive plate defined by a first portion of the lens assembly (e.g., the lens holder). The second capacitor may be formed from a third capacitive plate defined on the second side of the substrate and a fourth capacitive plate defined by a second portion of the lens assembly (e.g., an actuator frame). The first portion of the lens assembly may face the first side of the substrate and may be parallel therewith, thereby forming a first parallel plate capacitor. Similarly, the second portion of the lens assembly may face the second side of the substrate and may be parallel therewith, thereby forming a second parallel plate capacitor. The first portion of the lens assembly and the second portion of the lens assembly may each be formed from a conductive material.

The control circuitry may be configured to receive a respective capacitance measurement from each of the first capacitor and the second capacitor, and determine a difference signal based thereon. For example, the control circuitry may be configured to subtract a second capacitance measurement of the second capacitor from a first capacitance measurement of the first capacitor. The control circuitry may be configured to determine the position of the substrate relative to the lens assembly based on the difference signal (e.g., using a mapping of difference signal values to physical substrate positions). Such differential sensing of substrate position may (i) reduce and/or minimize a sensitivity of the capacitive position sensor to sources of common mode noise, including temperature, humidity, and component aging, (ii) reduce parasitic loading on electronic components associated with the capacitive position sensor, (iii) improve linearity and reduce gain error of the capacitive position sensor, and (iv) increase a sensitivity and/or resolution of the capacitive position sensor.

In some implementations, the first and third capacitive plates may each include a respective sensor electrode and respective one or more shield electrodes positioned adjacent to the respective sensor electrode. The sensor electrode and the one or more shield electrodes may be driven using a common signal (e.g., a time-varying voltage), and may thereby define a sensing zone of the sensor electrode. When actively driven, the shield electrodes may linearize an electric field associated with the sensing electrode, and may reduce or eliminate a sensitivity of the sensor electrode to stray capacitance.

Additionally, in some implementations, a width and length of the capacitive plates formed by the lens assembly may be larger than a width and length, respectively, of corresponding capacitive plates formed on the substrate. Thus, the capacitive position sensor may be configured to measure substrate movements along the optical axis, but may be relatively insensitive to substrate movement perpendicular to the optical axis. In some implementations, capacitive plates formed on the substrate may be shaped to define a groove, while capacitive plates formed by the lens assembly may be shaped to define a tongue that is configured to fit in and move relative to the groove.

The control circuitry may be configured to determine a target position at which to place the image sensor relative to the lens assembly based on a temperature measured at one or more locations within the camera device, and/or an extent of focus measured based on one or more images captured by the image sensor. For example, the control circuitry may implement an algorithm or model (e.g., a contrast detection algorithm, a phase detection algorithm, and/or a neural network model) configured to determine a focus score indicative of an extent to which at least one object (e.g., an object in an environment, a calibration target) in the one or more images is in-focus. The control circuitry may also be configured to determine the target position based on the focus score. For example, the target focus score may be selected to reduce and/or minimize an extent of defocus associated with the at least one object.

As temperature changes are observed by one or more temperature sensors, the control circuitry may be configured to adjust the target position to maintain the reduction and/or minimization of the extent of defocus associated with the at least one object (e.g., based on a predetermined drift of the position of the focal plane per degree Celsius). In one example, the focal plane may be determined to drift along the optical axis by up to 25 micrometers across a temperature range of 100 degrees Celsius (e.g., −15 degrees Celsius to 85 degrees Celsius), resulting in an average drift of 0.25 micrometers per degree Celsius. Accordingly, the target position may be adjusted by 0.25 µm/° C. relative to a position that, for a given set of environmental conditions, reduces and/or minimizes the extent of defocus associated with the at least one object. Additionally or alternatively, one or more humidity sensors may be used to measure the humidity (e.g., relative and/or absolute) at one or more locations within the camera device, and the control circuitry may be configured to adjust the target position accordingly (e.g., based on a predetermined amount of drift per unit change in humidity). The rate of drift of the focal plane may be calibrated on a per-camera-model basis and/or a per-camera basis to account for model-specific and/or device-specific variations.

II. EXAMPLE OPTICAL SYSTEMS

FIG. 1 illustrates a sensor system 100. Sensor system 100 may represent an optical system that includes lens assembly 110, substrate 130, image sensor 140, thermal sensor 170, capacitive position sensor 180, controller 186, and actuator(s) 194. In some embodiments, sensor system 100 may include and/or represent a camera system and/or a light detection and ranging (LIDAR) system. That is, sensor system 100 could include and/or represent systems for capturing video and/or still images, and/or LIDAR point cloud data. In some implementations, sensor system 100 may include and/or be used in combination with other types of sensors, such as, for example, radar devices, inertial sensors, and/or audio sensors, among other possibilities.

Lens assembly 110 may include one or more lens(es) 112. Lens(es) 112 may define an optical axis 114, a focal distance 116, and a focal plane 118, among other optical characteristics. Lens(es) 112 could include, for example, a spherical lens, an aspherical lens, a cylindrical lens, a Fresnel lens, a gradient index lens, and/or a diffractive optical lens, among other possibilities. Lens(es) 112 could be formed from plastic, glass, or another optical material. Lens assembly 110 may also include lens holder 120, which may be coupled to lens(es) 112 to position lens(es) 112 with respect to substrate 130 and/or image sensor 140, among other components. Lens assembly 110 may further include actuator frame 160, which may be coupled to lens holder 120 to position actuator(s) 194 with respect to lens(es) 112 and/or substrate 130, among other components. Lens holder 120 and/or actuator frame 160 may, in some cases, be viewed as components that are independent of lens assembly 110 (rather than a subset thereof).

Substrate 130 may include a first (e.g., top) surface/side and a second (e.g., bottom) surface/side. In some embodiments, substrate 130 could include a printed circuit board (PCB), a semiconductor substrate, or another flexible or rigid body. Image sensor 140 may be attached to the first surface/side of substrate 130. The material of substrate 130 may be selected, for example, to (i) match a coefficient of thermal expansion (CTE) of image sensor 140 and/or (ii) provide high thermal conductivity to allow for efficient cooling of image sensor 140, among other considerations. For example, substrate 130 may include a ceramic PCB made out of aluminum oxide, aluminum nitride, beryllium oxide, or another ceramic material. In some implementations, the ceramic PCB may be a co-fired ceramic, such as a high temperature co-fired ceramic (HTCC) or a low temperature co-fired ceramic (LTCC). Alternatively or additionally, substrate 130 may include a low-CTE FR-4 material (i.e., fiberglass layers bonded with epoxy resin). In one example, the ceramic PCB may be bonded to image sensor 140 by way of a ball grid array.

In some implementations, one or more additional PCBs may be coupled to lens holder 120. The additional PCBs may include electrical connector(s) and/or electrical component(s), and may be electrically connected to substrate 130 by way of flexible PCB connector(s). The additional PCB(s) may include, for example, a laminate-based PCB configured to accommodate repeated plugging into and unplugging from the electrical connector(s). The laminate-based PCB may be formed from laminae bonded together with a polymer resin. For example, the laminate-based PCB may be an FR-4 board, a CEM-3 board, or another non-ceramic material having similar physical properties.

The flexible PCB connector(s) may provide a variable bend radius to accommodate repositioning of lens assembly 110, on which the additional PCB is mounted, relative to substrate 130. The electrical connector(s) provided on the additional PCB(s) may be exposed outside of a housing of sensor system 100 and configured to provide at least a portion of signals generated by image sensor 140. The electrical component(s) provided on the additional PCB(s) may be configured to process signals generated by image sensor 140, capacitive position sensor 180, and/or other components of sensor system 100 (e.g., before such signals are exposed outside of the housing by way of the electrical connector(s)).

Actuator(s) 194 may be configured to reposition image sensor 140 to a target position relative to lens assembly 110. Actuator(s) 194 may be configured to maintain image sensor 140 at focal plane 118 and/or within a depth of focus of lens assembly 110 over a predetermined temperature range (e.g., −30 to 85° C.). That is, the target position may be at focal plane 118 and/or within the depth of focus of lens assembly 110 (e.g., within a threshold distance above and below focal plane 118).

Actuator(s) 194 may include piezoelectric structure(s) 196 coupled between actuator frame 160 and substrate 130. In some embodiments, at least a portion of piezoelectric structure(s) 196 could be arranged coaxially about the optical axis 114. Piezoelectric structure(s) 196 may be formed from a variety of piezoelectric materials, including, but not limited to, lead zirconate titanate (e.g., PZT), lithium niobate, barium titanate, potassium niobate, sodium tungstate, sodium potassium niobate, and/or bismuth ferrite, among other possibilities.

In some embodiments, piezoelectric structure(s) 196 could include a piezoelectric tube. For example, the piezoelectric tube could be a piezoelectric tube actuator, such as Thorlabs PT49LM or PI PT120-PT140 Series piezo tubes. In some embodiments, the piezoelectric tube could be configured to provide a desired axial expansion/contraction value and/or a desired diameter expansion/contraction value (e.g., based on a known and/or expected thermally-induced expansion or contraction of various components of sensor system 100). The piezoelectric tube may be controllable so as to adjust at least one of (i) a distance between lens(es) 112 and image sensor 140 or (ii) a tip or tilt of image sensor 140 with respect to focal plane 118, among other aspects of the geometric arrangement of elements in sensor system 100.

In other embodiments, piezoelectric structure(s) 196 could additionally or alternatively include a piezoelectric linear actuator. For example, the piezoelectric linear actuator may include a plurality of piezoelectric linear actuators stacked on top of one another. In some embodiments, the piezoelectric linear actuator could be configured to provide a desired axial expansion/contraction value (e.g., based on a known or expected thermally-induced expansion or contraction of various components of sensor system 100).

In some implementations, piezoelectric structure(s) 196 could form two or more stacks or posts arranged at respective positions along substrate 130. For example, piezoelectric linear actuators may form four stacks, with a first stack positioned above image sensor 140, a second stack positioned below image sensor 140, a third stack positioned to the right of image sensor 140, and a fourth stack positioned to the left of image sensor 140 (when viewed from a top view). In such a scenario, each of the stacks could be configured to be separately controllable so as to adjust at least one of (i) a distance between lens(es) 112 and image sensor 140 or (ii) a tip or tilt of image sensor 140 with respect to focal plane 118, among other aspects of the geometric arrangement of elements in sensor system 100.

In various embodiments, actuator(s) 194 may additionally or alternatively include other types of actuators, such as, for example, stepper motor 198. For example, actuator(s) 194 could include piezoelectric structure(s) 196 and stepper motor 198, which could be configured to provide micro and macro movements, respectively, in the axial direction. In other words, piezoelectric structure(s) 196 could be utilized to provide fine axial position adjustments (e.g., less than ±100 microns) and stepper motor 198 could be configured to provide coarse axial position adjustments (e.g., greater than ±100 microns). Additionally or alternatively, actuator(s) 194 may include a voice coil actuator.

In some embodiments, sensor system 100 could additionally include thermal sensor 170. Thermal sensor 170 may be configured to provide information indicative of a current temperature of at least a portion of sensor system 100. In such a scenario, at least one property of actuator(s) 194 could be configured to be adjusted based on the current temperature. In some embodiments, thermal sensor 170 could include a thermocouple, a thermometer, a thermistor, a semiconductor-based device, and/or another type of temperature-sensing device. In some implementations, thermal sensor 170 may be integrated with image sensor 140. Thermal sensor 170 may include a plurality of thermal sensors distributed throughout the housing of sensor system 100, and may thus be capable of monitoring temperature gradients within the housing.

Additionally, sensor system 100 may include capacitive position sensor 180. Capacitive position sensor 180 may be configured to provide information indicative of a position of image sensor 140 and/or substrate 130 with respect to lens assembly 110 (e.g., with respect to lens holder 120 and/or actuator frame 160). In such scenarios, at least one property of actuator(s) 194 may be configured to be adjusted based on the position of image sensor 140 and/or substrate 130 with respect to lens assembly 110.

In some embodiments, capacitive position sensor 180 may include first capacitive plate 182 and second capacitive plate 184. For example, first capacitive plate 182 may be coupled to, mounted on, formed on, and/or defined on substrate 130, and second capacitive plate 184 may be coupled to, mounted on, formed on, and/or defined on lens assembly 110 (e.g., on lens holder 120 and/or actuator frame 160). Additionally or alternatively, sensor system 100 may include a magnetic position sensor, an ultrasonic position sensor, an inductive position sensor, an optical position sensor, and/or a laser-doppler vibrometer. Other types of position sensors are possible and contemplated.

In some embodiments, sensor system 100 could also include controller 186. Controller 186 may include one or more processor(s) 188 and memory 190. Additionally or alternatively, controller 186 may include a field-programmable gate array (FPGA) and/or an application-specific integrated circuit (ASIC). As an example, processor(s) 188 may include a general-purpose processor or a special-purpose processor (e.g., digital signal processors, etc.). Processor(s) 188 may be configured to execute computer-readable program instructions that are stored in memory 190. In some embodiments, processor(s) 188 may execute the program instructions to provide at least some of the functionality and operations described herein.

Memory 190 may include or take the form of one or more computer-readable storage media that may be read or accessed by processor(s) 188. The one or more computer-readable storage media can include volatile and/or non-volatile storage components, such as optical, magnetic, organic, or other memory or disc storage, which may be integrated in whole or in part with at least one of processor(s) 188. In some embodiments, memory 190 may be implemented using a single physical device (e.g., one optical, magnetic, organic, or other memory or disc storage unit), while in other embodiments, memory 190 may be implemented using two or more physical devices.

In some embodiments, the operations executable by controller 186 may include determining control signal 192 to compensate for a focus shift between lens(es) 112 and image sensor 140. In such scenarios, the operations may also include providing control signal 192 to actuator(s) 194. Control signal 192 may be configured to cause actuator(s) 194 to move image sensor 140 to the target position relative to lens assembly 110.

In embodiments involving thermal sensor 170, the operations could additionally or alternatively include receiving, from thermal sensor 170, information indicative of a current temperature of at least a portion of sensor system 100. In such scenarios, determining control signal 192 could be based, at least in part, on the current temperature. For example, the target position of image sensor 140 may be determined based on the current temperature.

In embodiments involving capacitive position sensor 180, the operations may additionally or alternatively include receiving, from capacitive position sensor 180, information indicative of a relative position of image sensor 140 with respect to lens assembly 110 and/or lens holder 120. In such scenarios, determining control signal 192 could be based on the relative position of image sensor 140 with respect to lens assembly 110.

In some embodiments, the operations could additionally or alternatively involve obtaining, from image sensor 140, image data representing an object in an environment, and determining, based on the image data, a focus score indicative of an extent of focus and/or defocus associated with the object. That is, an extent to which image sensor 140 is outside of focal plane 118 and/or outside of the depth of focus may be quantified using image data generated by image sensor 140. Accordingly, the target position for image sensor 140 may be determined based on the focus score, thereby compensating for the observed defocus associated with the object in the environment.

For example, the focus score may be generated by a contrast detection auto-focus algorithm, a phase detection auto-focus algorithm, and/or a machine learning model (e.g., an artificial neural network) that has been trained to quantify the extent of focus and/or defocus, among other possibilities. In some cases, the object represented by the image data may be a calibration target, such as a Modulation Transfer Function (MTF) target with known and/or expected properties. Additionally or alternatively, the image data may be captured under known and/or predetermined conditions, including a known and/or predetermined distance between sensor system 100 and the object, and/or known and/or predetermined lighting conditions, among others.

Figure 2:
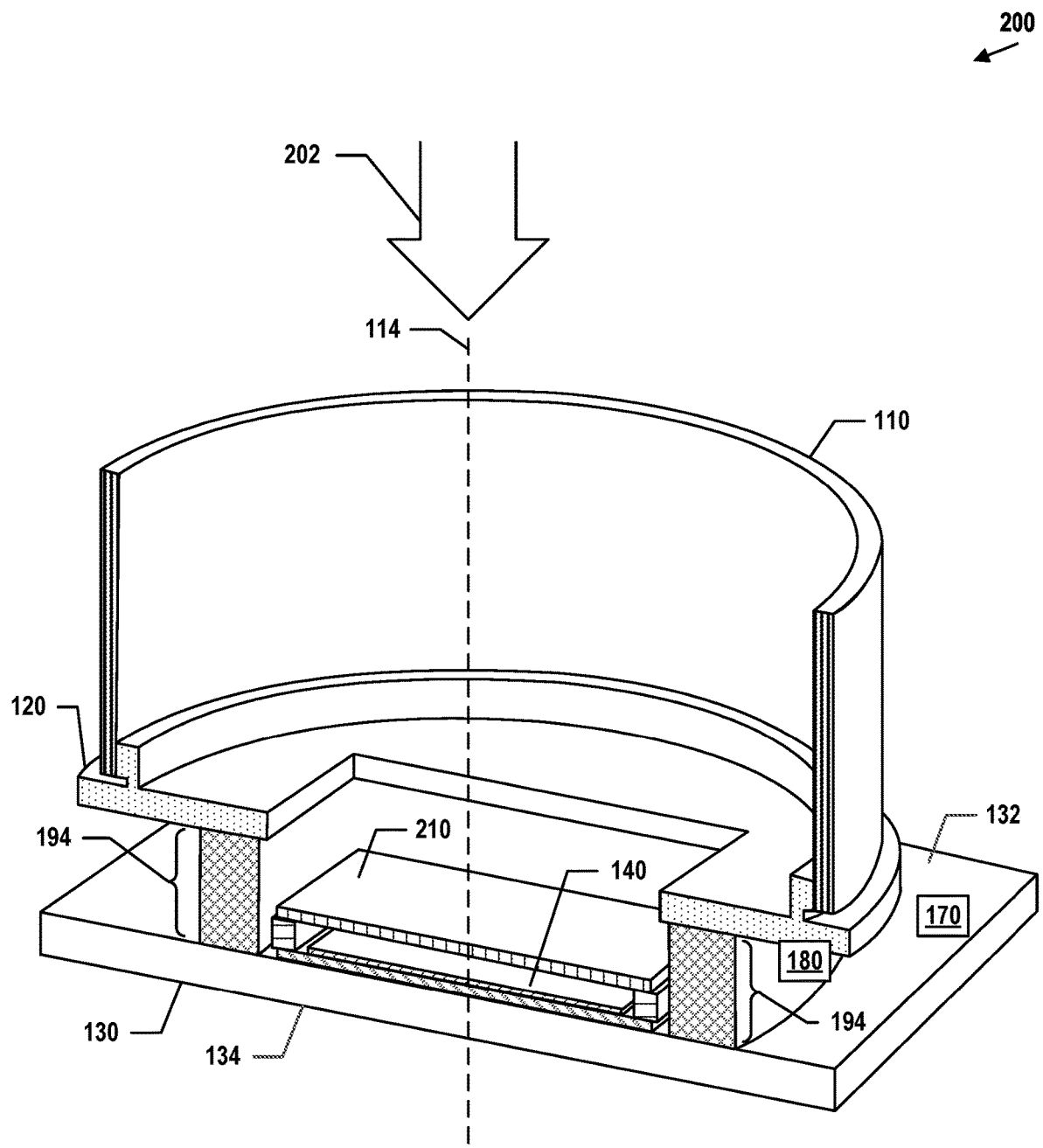
FIG. 2 illustrates an optical system, in accordance with example embodiments.
Figure 3A:
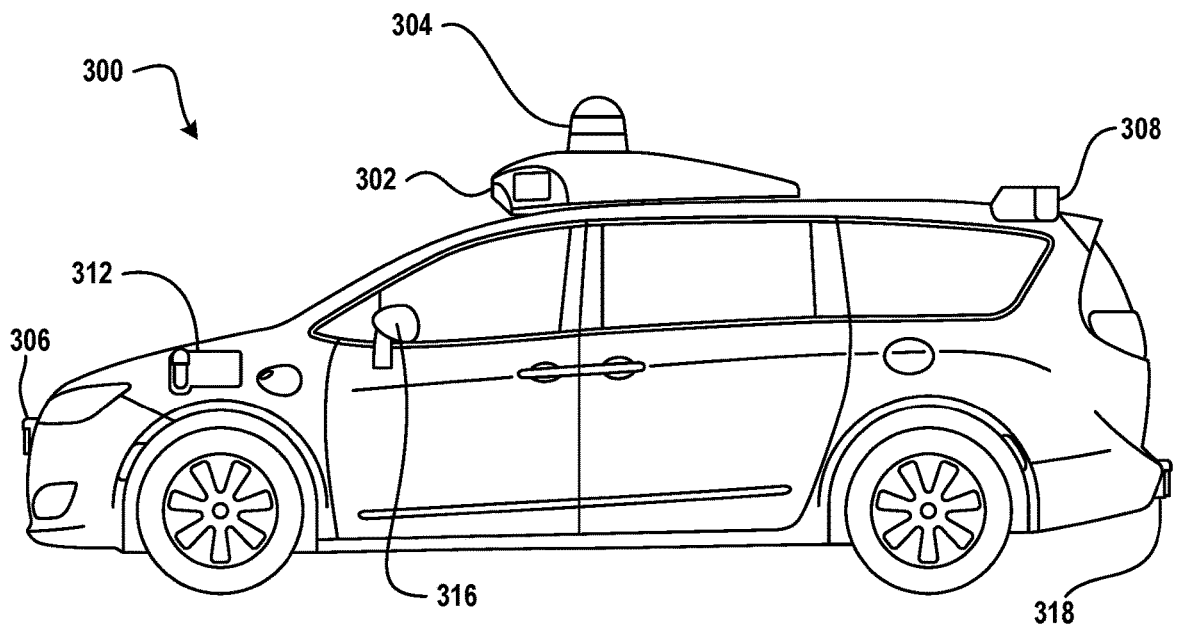
FIGS. 3A, 3B, 3C, 3D, and 3E illustrate a vehicle, in accordance with example embodiments.
Figure 3B:
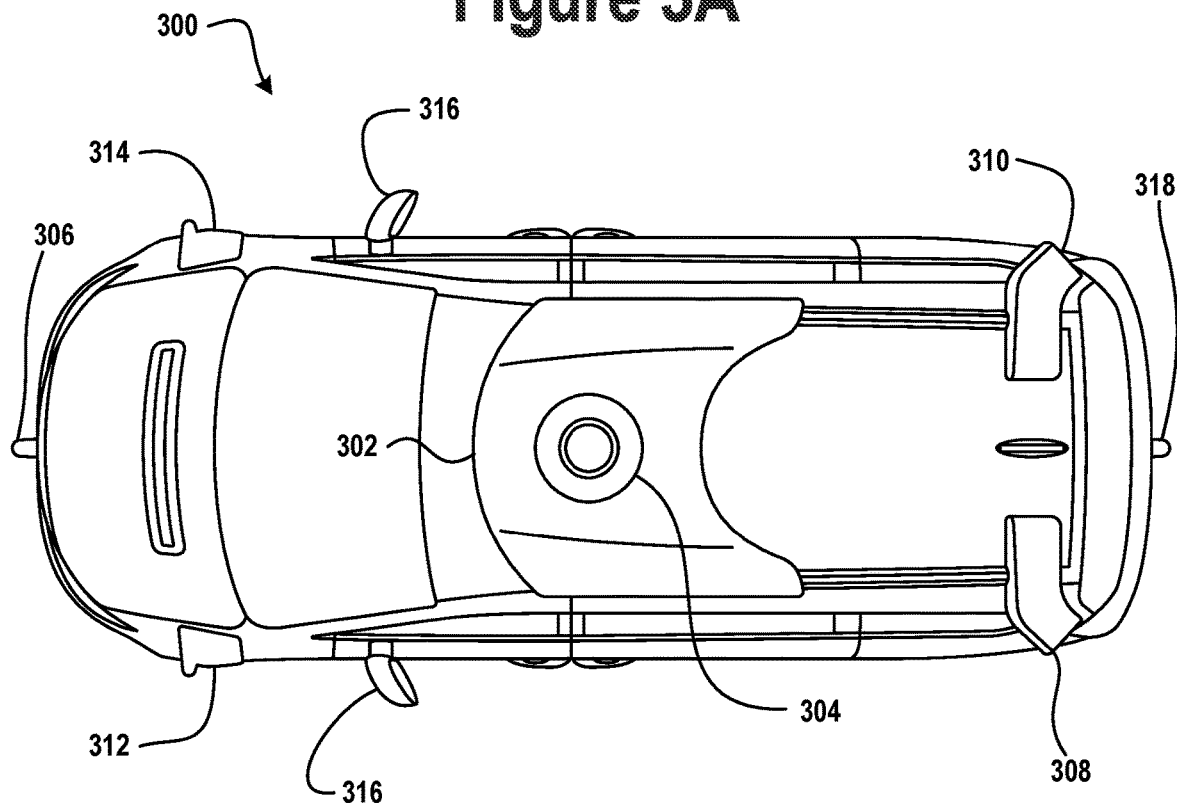
Figure 3C:
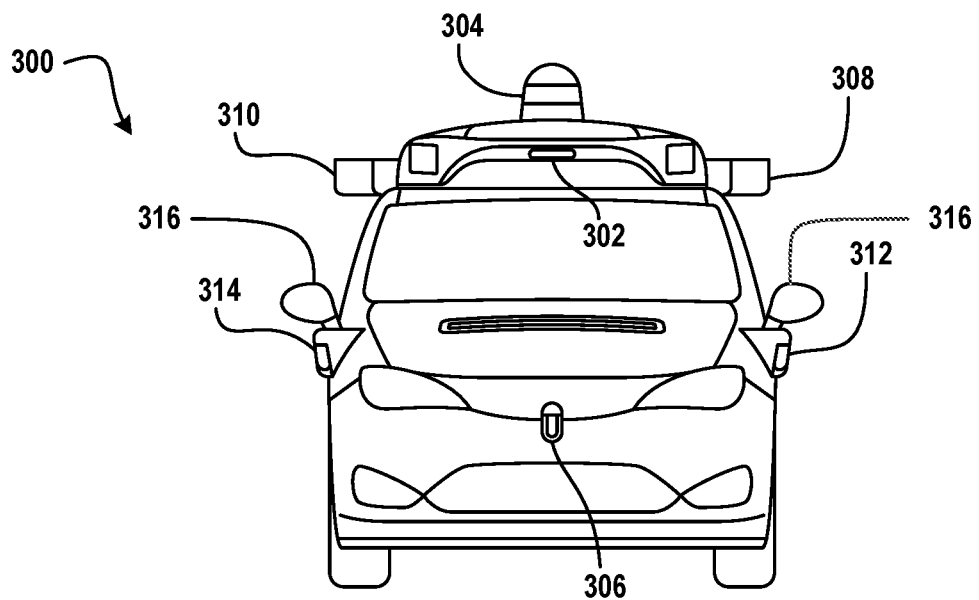
Figure 3D:
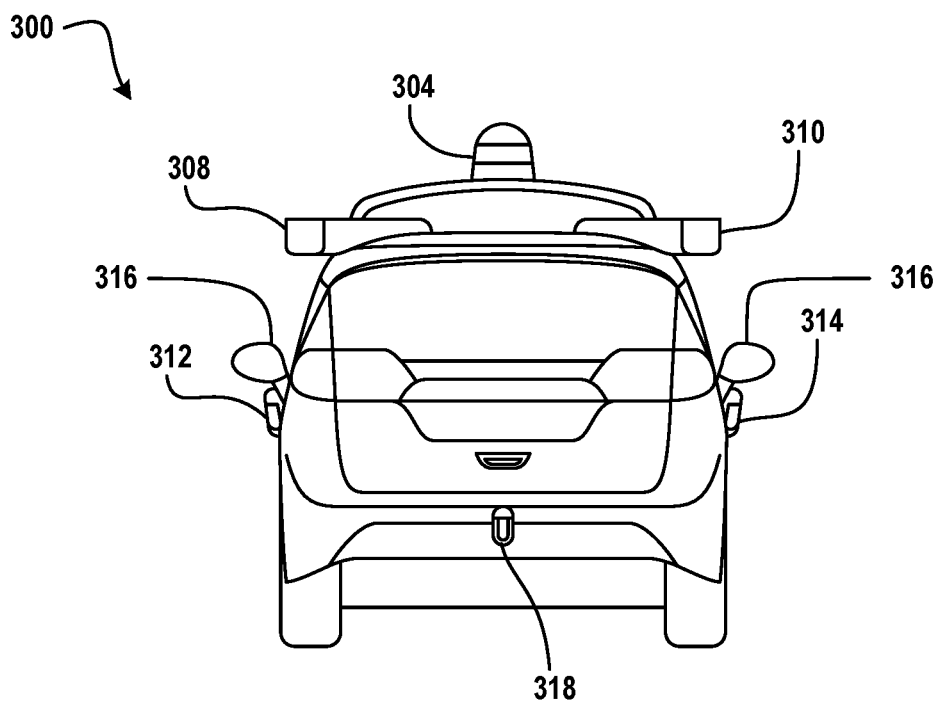
Figure 3E:
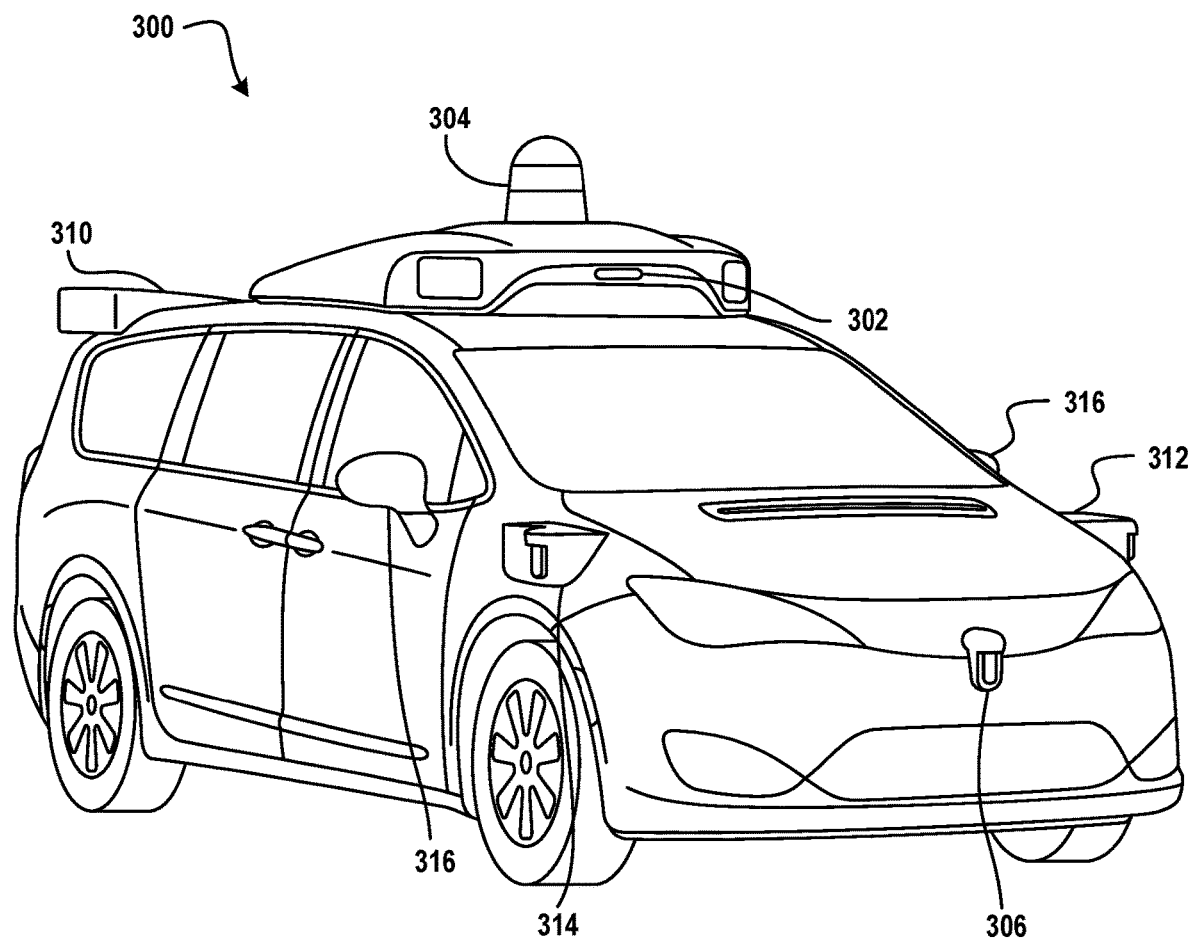

FIG. 2 illustrates optical system 200. Optical system 200 may include elements that are similar or identical to those of sensor system 100 (e.g., optical system 200 may include fewer or more elements than sensor system 100), as illustrated and described in relation to FIG. 1. For example, optical system 200 may include substrate 130 having first surface/side 132 (e.g., top surface/side) and second surface/side 134 (e.g., bottom surface/side). Image sensor 140 may be mounted directly or indirectly (e.g., via a readout integrated circuit (ROIC)) to first surface/side 132 of substrate 130. In some embodiments, optical element 210 (e.g., an infrared filter) could be disposed along optical axis 114.

Optical system 200 may include actuator(s) 194 disposed between lens holder 120 and substrate 130. Lens holder 120 may be coupled to part of lens assembly 110, which may include one or more lens(es) 112, which may define optical axis 114, focal distance 116, and/or focal plane 118. Actuator(s) 194 may be configured to control a relative position of image sensor 140 with respect to lens assembly 110. In some implementations, actuator(s) 194 may at least partially surround image sensor 140 and/or optical element 210, among other components. For example, the piezoelectric tube may continuously surround image sensor 140 (i.e., image sensor 140 may be disposed in an interior volume of the piezoelectric tube). In another example, stacks of the piezoelectric linear actuators may be disposed around image sensor 140 in a discontinuous fashion, such that space between these stacks may remain vacant.

Optical system 200 may include capacitive position sensor 180 and thermal sensor 170. It will be understood that while FIG. 2 illustrates capacitive position sensor 180 and thermal sensor 170 at particular locations with respect to other elements of optical system 200, other locations of capacitive position sensor 180 and thermal sensor 170 are possible and contemplated. Arrow 202 provides a reference point between the view of FIG. 2 and the views of FIGS. 4A, 4B, and 4C.

III. EXAMPLE VEHICLES

FIGS. 3A, 3B, 3C, 3D, and 3E (i.e., FIGS. 3A-3E) show an example vehicle 300 that can include some or all aspects of sensor systems and/or the optical systems described herein. In some embodiments, vehicle 300 could be a semi-autonomous vehicle configured to provide some driving automation to a human operator (e.g., driver assistance, adaptive cruise control, etc.) and/or a fully-autonomous vehicle configured to operate with little to no human interaction. Although vehicle 300 is illustrated in FIGS. 3A-3E as a van for illustrative purposes, the present disclosure is not so limited. For example, vehicle 300 can represent a truck, a car, a semi-trailer truck, a motorcycle, a golf cart, an off-road vehicle, a farm vehicle, or a drone that can navigate within its environment using sensors and other information about its environment.

Vehicle 300 may include a sensor unit 302, first lidar unit 304, second lidar unit 306, first radar unit 308, second radar unit 310, first lidar/radar unit 312, second lidar/radar unit 314, and two additional locations 316 and 318 at which a radar unit, a lidar unit, a laser rangefinder unit, an audio sensor, an inertial sensor, a camera device, and/or other type of sensor(s) could be located on vehicle 300. Each of first lidar/radar unit 312 and second lidar/radar unit 314 can take the form of a lidar unit, a radar unit, or both. First and second radar units 308 and 310, and/or first and second lidar units 304 and 306 can actively scan the surrounding environment for the presence of potential obstacles.

Sensor unit 302 may be mounted atop vehicle 300 and may include one or more sensors configured to detect information about an environment surrounding vehicle 300, and output indications of the information. For example, sensor unit 302 may include any combination of cameras, radars, lidars, range finders, inertial sensors, humidity sensors, and acoustic sensors. Sensor unit 302 may include one or more movable mounts that may be operable to adjust the orientation of one or more sensors in sensor unit 302. In one embodiment, the movable mount may include a rotating platform that may scan sensors so as to obtain information from each direction around vehicle 300. In another embodiment, the movable mount of sensor unit 302 could be movable in a scanning fashion within a particular range of angles (e.g., azimuths and/or elevations). Sensor unit 302 could be mounted atop the roof of a car, although other mounting locations are possible.

Additionally, the sensors of sensor unit 302 could be distributed in different locations and need not be collocated in a single location. Some possible sensor types and mounting locations include the two additional locations 316 and 318. Furthermore, each sensor of sensor unit 302 can be configured to be moved or scanned independently of other sensors of sensor unit 302.

In an example configuration, one or more radar scanners (e.g., first and second radar units 308 and 310) may be located near the rear of vehicle 300, to actively scan the environment near the back of vehicle 300 for the presence of radio-reflective objects. Similarly, first lidar/radar unit 312 and second lidar/radar unit 314 may be mounted near the front of vehicle 300 to actively scan the environment near the front of vehicle 300. A radar scanner can be situated, for example, in a location suitable to illuminate a region including a forward-moving path of vehicle 300 without occlusion by other features of vehicle 300. For example, a radar scanner can be embedded in and/or mounted in or near the front bumper, front headlights, cowl, and/or hood, etc. Furthermore, one or more additional radar scanning devices can be located to actively scan the side and/or rear of vehicle 300 for the presence of radio-reflective objects, such as by including such devices in or near the rear bumper, side panels, rocker panels, and/or undercarriage, etc.

Although not shown in FIGS. 3A-3E, vehicle 300 can include a wireless communication system. The wireless communication system may include wireless transmitters and receivers that could be configured to communicate with devices external or internal to vehicle 300. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Vehicle 300 may include a camera, possibly at a location inside sensor unit 302. The camera can be a photosensitive instrument, such as a still camera, a video camera, etc., that is configured to capture a plurality of images of the environment of vehicle 300. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which vehicle 300 illuminates an object in the environment with a predetermined light pattern, such as a grid or checkerboard pattern and uses the camera to detect a reflection of the predetermined light pattern from environmental surroundings. Based on distortions in the reflected light pattern, vehicle 300 can determine the distance to the points on the object. The predetermined light pattern may comprise infrared light, or radiation at other suitable wavelengths for such measurements.

In some examples, the camera can be mounted inside a front windshield of vehicle 300. Specifically, the camera can be situated to capture images from a forward-looking view with respect to the orientation of vehicle 300. Other mounting locations and viewing angles of camera can also be used, either inside or outside vehicle 300. Further, the camera can have associated optics operable to provide an adjustable field of view. Still further, the camera can be mounted to vehicle 300 with a movable mount to vary a pointing angle of the camera, such as via a pan/tilt mechanism.

A control system of vehicle 300 may be configured to control vehicle 300 in accordance with a control strategy from among multiple possible control strategies. The control system may be configured to receive information from sensors coupled to vehicle 300 (on or off vehicle 300), modify the control strategy (and an associated driving behavior) based on the information, and control vehicle 300 in accordance with the modified control strategy. The control system further may be configured to monitor the information received from the sensors, and continuously evaluate driving conditions; and also may be configured to modify the control strategy and driving behavior based on changes in the driving conditions.

In some embodiments, sensor units 302, 304, 306, 308, 310, 312, and/or 314 may include systems 100, 200, 400, 430, and/or 460 as illustrated and described in relation to FIGS. 1, 2, 4A, 4B, and 4C, respectively. For example, systems 100, 200, 400, 430, and/or 460 could be implemented with the LIDAR sensors and/or camera sensors of vehicle 300 to compensate for thermal expansion effects that may otherwise negatively affect optical system performance. The actuator(s) 194 of such optical systems could be configured to adjust an axial position of the respective image sensors 140 with respect to the respective lens assemblies 110 and/or respective lens(es) 112. It will be understood that the optical systems described herein could be incorporated in other ways with respect to vehicle 300. In other words, the optical systems described elsewhere herein may be coupled to vehicle 300 and/or may be utilized in conjunction with various operations of vehicle 300. As an example, systems 100, 200, 400, 430, and/or 460 could be utilized in self-driving or other types of navigation, planning, perception, and/or mapping operations of vehicle 300. In general, systems 100, 200, 400, 430, and/or 460 could be utilized by vehicle 300 in any operating mode that uses data generated by one or more of these systems.

IV. EXAMPLE CAPACITIVE POSITION SENSING ARRANGEMENTS

Figure 4A:
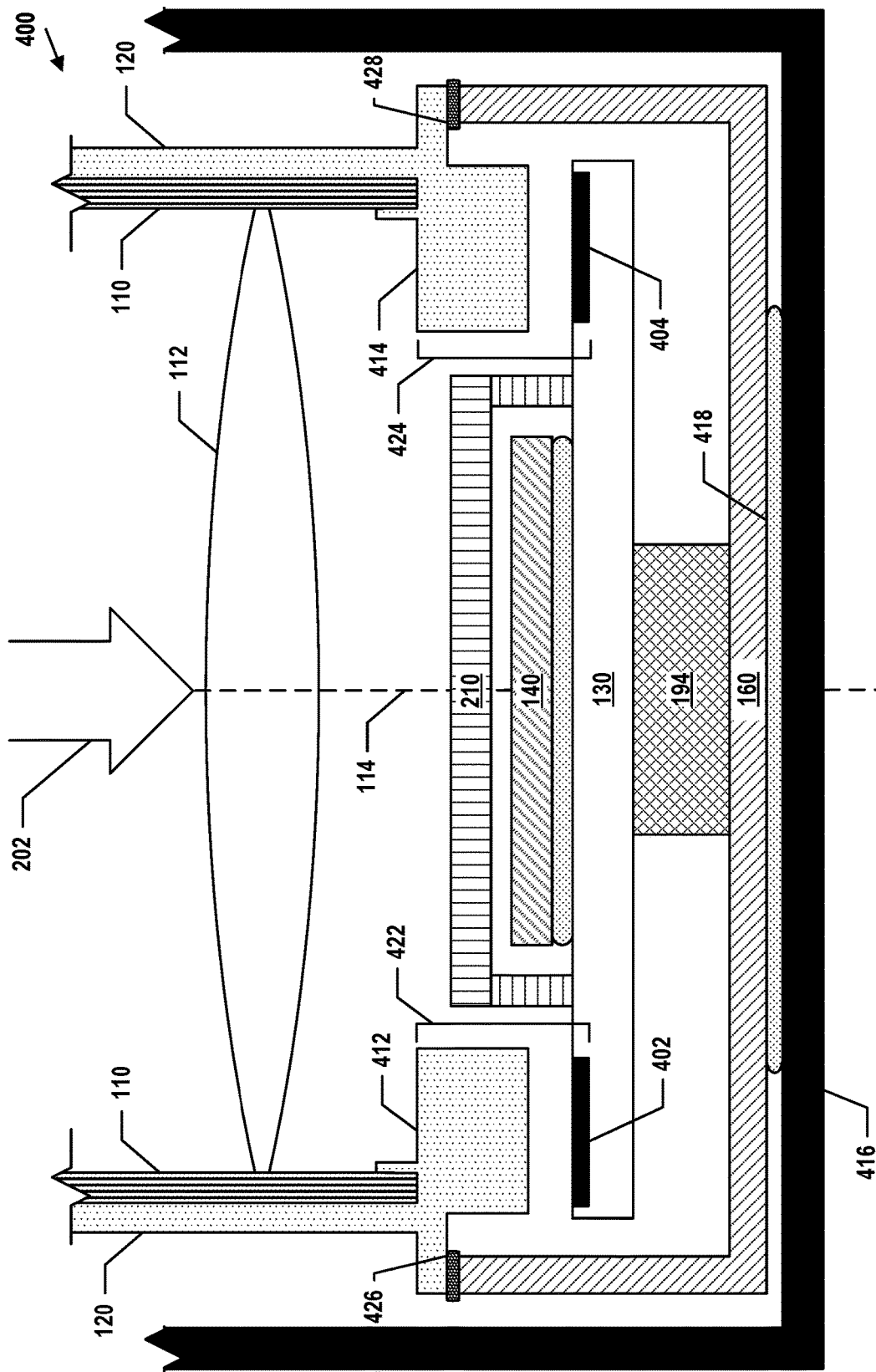
FIG. 4A illustrates an optical system with a capacitive position sensor, in accordance with example embodiments.

FIG. 4A illustrates optical system 400. At least some elements of optical system 400 could be similar or identical to the elements of systems 100 or 200 (e.g., optical system 400 may include fewer or more elements than systems 100 and/or 200), as illustrated and described in relation to FIGS. 1 and 2, and/or could be combined therewith. As illustrated in FIG. 4A, optical system 400 may include a "stackup" of actuator(s) 194, substrate 130, and lens assembly 110. Alternative stackups are possible and contemplated.

Specifically, lens assembly may include lens holder 120, which may be fixedly connected to actuator frame 160. In one example, lens holder 120 may be coupled to actuator frame 160 by way of adhesive 426 and adhesive 428. In another example, lens holder and actuator frame 160 may be integral with one another, and adhesive 426 and 428 may thus be omitted. Actuator(s) 194 may be mounted to actuator frame 160, substrate 130 may be mounted to actuator(s) 194, and image sensor 140 may be mounted to substrate 130. Thus, actuator frame 160 may provide a fixed physical reference relative to which substrate 130 may be repositioned by actuator(s) 194 to move image sensor 140 relative to lens assembly 110.

Optical system 400 may additionally include a capacitive position sensor, which may include at least one capacitor formed by a first capacitive plate coupled to and/or defined on substrate 130 and a second capacitive plate coupled to and/or defined by a portion of lens assembly 110. Specifically, the capacitive position sensor may include capacitor 422 formed by (i) electrode 402 coupled to and/or defined on substrate 130 and (ii) portion 412 of lens holder 120 and/or an electrode coupled to portion 412. Thus, electrode 402 may correspond to first capacitive plate 182 of capacitive position sensor 180, and portion 412 (or the electrode coupled thereto) may correspond to second capacitive plate 184.

Specifically, portion 412 may include at least one side, face, and/or surface that faces and is parallel with electrode 402, such that portion 412 and electrode 402 form and/or approximate a parallel plate capacitor. Electrode 402 and the corresponding face of portion 412 may be considered parallel even if these two components deviate from exact parallelism due to manufacturing variations, mechanical vibrations, and/or other factors (e.g., by up to 5 degrees). Electrode 402 may be formed using metal or other conductive material. In implementations where lens holder 120 is formed from a conductive material, portion 412 may itself operate as the capacitive plate, since portion 412 is conductive. In implementations where lens holder 120 is formed from a non-conductive material, portion 412 may include an electrode coupled to at least the side, face, and/or surface that faces and is parallel with electrode 402, and the electrode may operate as the capacitive plate. Other capacitors discussed herein may be structured in a manner similar to capacitor 422.

The capacitance of capacitor 422 may vary as substrate 130 moves relative to lens assembly 110, and may thus be indicative of a relative position between image sensor 140 and lens assembly 110. Specifically, the capacitance of capacitor 422 may be inversely proportional to the distance between electrodes 412 and 402, and may thus increase as substrate 130 moves up and towards lens holder 120 and decrease as substrate 130 moves down and away from lens holder 120.

The capacitive position sensor may also include capacitor 424 formed by (i) electrode 404 coupled to and/or defined on substrate 130 and (ii) portion 414 of lens holder 120 and/or an electrode coupled to portion 414. In some implementations, electrode 402 may be physically discontinuous with and/or electrically disconnected from electrode 404, and portion 412 may be physically discontinuous with and/or electrically disconnected from portion 414. Accordingly, capacitor 422 and capacitor 424 may be physically and/or electrically separate, and the respective capacitances thereof may be measured independently. Accordingly, a position of the left side of substrate 130 may be determined independently of a position of the right side of substrate 130.

In other implementations, electrode 402 may be physically continuous with and/or electrically connected to electrode 404, and portion 412 may be physically continuous with and/or electrically connected to portion 414. Accordingly, capacitor 422 and capacitor 424 may collectively form a single capacitor, with electrodes 402 and 404 collectively forming the first plate of the single capacitor and portions 412 and 414 collectively forming the second plate of the single capacitor.

In order to measure the capacitance(s) of capacitor 422 and/or capacitor 424, a voltage may be applied to at least one plate of capacitor 422 and/or capacitor 424. The voltage may be applied by, for example, circuitry provided on substrate 130 or on another substrate present within optical system 400. In one example, the voltage may be a predetermined constant voltage. Thus, for example, capacitor 422 and/or capacitor 424 may be connected in series with at least one reference capacitor that has a known and/or predetermined capacitance, and the capacitance(s) of capacitor 422 and/or capacitor 424 may be determined based on voltage(s) measured across capacitor 422, capacitor 424, and/or the reference capacitor. In another example, the voltage may be a time-varying voltage having a predetermined frequency.

Thus, for example, capacitance(s) of capacitor 422 and/or capacitor 424 may be determined based on measured impedance(s) of capacitor 422 and/or capacitor 424 to the time-varying voltage. In some implementations, the capacitance measurement may be facilitated by Capacitance-to-Digital Converter AD7747 provided by ANALOG DEVICES, or a similar component.

In some implementations, portions 412 and/or 414 may be grounded, and the voltage may be applied to electrodes 402 and/or 404, thereby allowing for a self capacitance measurement of capacitors 422 and/or 424. In other implementations, actuator frame 160 may be grounded, a positive voltage may be applied to electrodes 402 and/or 404, and a negative voltage may be applied to portions 412 and/or 414 (or vice versa), thereby allowing for a transfer capacitance measurement of capacitors 422 and/or 424. In additional implementations, actuator frame 160 and lens holder 120 may each be grounded, electrodes 402 and/or 404 may each be divided into two separate electrodes, a positive voltage may be applied to a first of the two separate electrodes, and a negative voltage may be applied to a second of the two separate electrodes, thereby allowing for an alternative transfer capacitance measurement of capacitors 422 and/or 424. In further implementations, actuator frame 160, electrode 402, and electrode 404 may each be grounded, and a voltage may be applied to portions 412 and/or 414. Accordingly, a first additional capacitor may be formed between portion 412 and actuator frame 160 with adhesive 426 operating as a first dielectric, and a second additional capacitor may be formed between portion 414 and actuator frame 160 with adhesive 428 operating as a second dielectric, thereby allowing for a differential capacitance measurement of capacitor 422, capacitor 424, the first additional capacitor, and the second additional capacitor. Respective capacitances of other capacitors discussed herein may be measured in similar ways.

Applying a voltage to electrode 402 and/or electrode 404 while grounding portions of lens holder 120 and/or actuator frame 160 may facilitate routing of electrical signals from the capacitive position sensor to electrical components that are configured to process these signals to determine the distance between image sensor 140 and lens assembly 110. Specifically, it may be easier and/or more convenient to apply voltages to components located on substrate 130 where electrical connectivity is readily available, rather than to other components where electrical connectivity may be more difficult to establish. For example, when a voltage is applied to portions of lens holder 120 and/or actuator frame 160, routing of signals therefrom to substrate 130 and/or to another PCB may involve using additional electrical connectors, which may provide an added point of failure of optical system 400.

Although the cross-sectional view of FIG. 4A shows two capacitors (i.e., 422 and 424), additional capacitors may be disposed around image sensor 140. For example, four such capacitors may be provided in a symmetric arrangement around image sensor 140, thus allowing for monitoring of the tip (e.g., rotation along y-axis) and tilt (e.g., rotation along x-axis) of image sensor 140 in addition to monitoring the position of image sensor 140 along the z-axis. The capacitors of other optical systems discussed herein may be similarly arranged.

Optical system 400 may further include housing 416, which may be connected to lens holder 120 and/or to actuator frame 160. Housing 416 may contain therein substrate 130, image sensor 140, actuator(s) 194, at least part of lens assembly 110, and the capacitive position sensor, among other components. Housing 416 may shield and protect these components from the outside environment. Housing 416 may define therein an opening through which one or more electrical connectors may protrude so as to be accessible outside housing 416, thus allowing optical system 400 to communicate with other components or systems. In some implementations, thermal interface material (TIM) 418 may be disposed between housing 416 and actuator frame 160. Thus, heat from image sensor 140 may be dissipated to housing 416 by way of substrate 130, actuator(s) 194, and TIM 418.

Figure 4B:
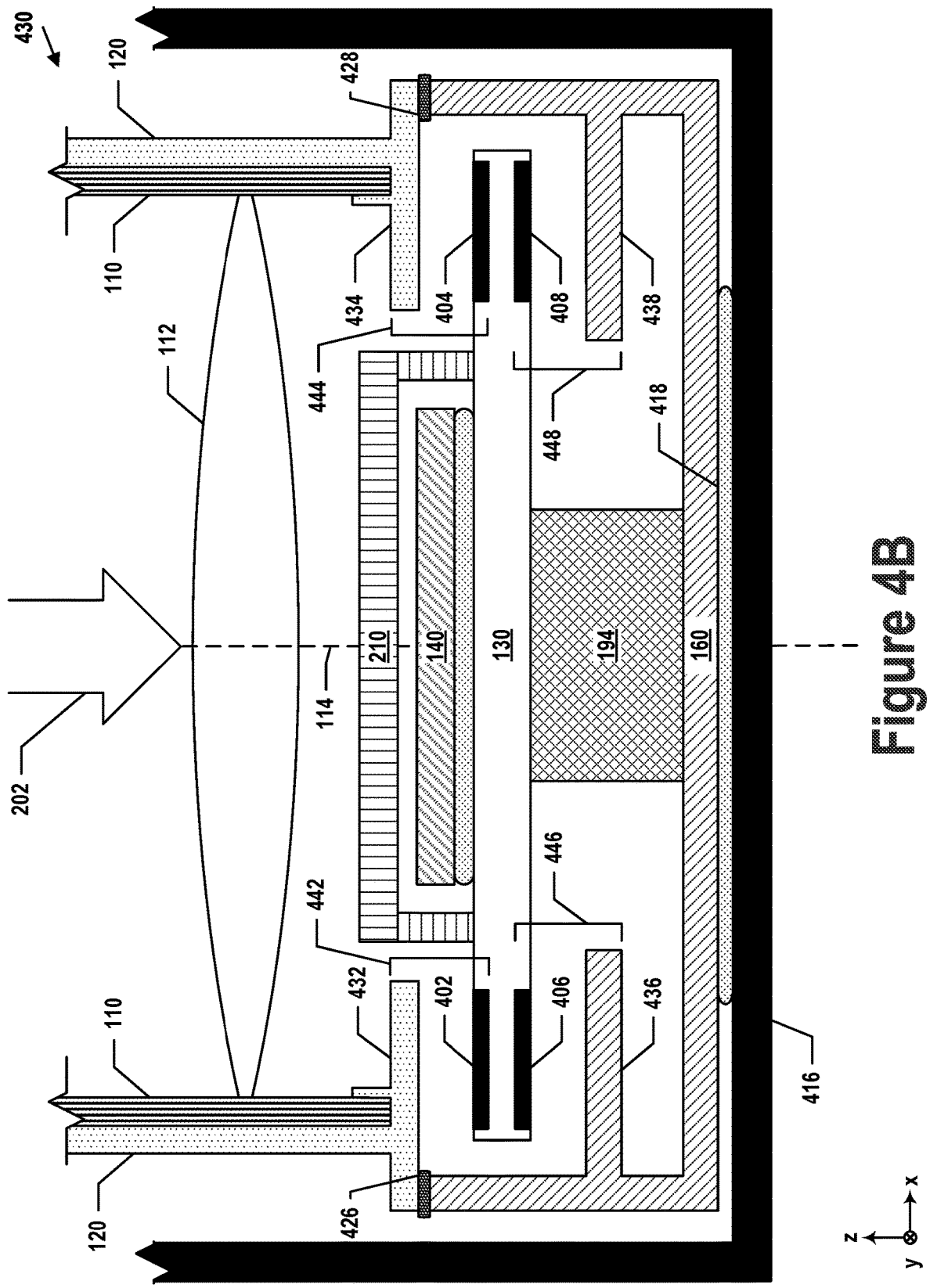
FIG. 4B illustrates an optical system with a differential capacitive position sensor, in accordance with example embodiments.

FIG. 4B illustrates optical system 430. At least some elements of optical system 430 could be similar or identical to the elements of systems 100, 200, and/or 400 (e.g., optical system 430 may include fewer or more elements than systems 100, 200, and/or 400), as illustrated and described in relation to FIGS. 1, 2, and 4A, and/or could be combined therewith.

Optical system 430 includes a capacitive position sensor that has a differential architecture. The capacitive position sensor of optical system 430 may include at least two capacitors, each including a respective first capacitive plate coupled to and/or defined on substrate 130 and a respective second capacitive plate coupled to and/or defined by a corresponding portion of lens assembly 110. Specifically, the capacitive position sensor may include capacitor 442 formed by (i) electrode 402 coupled to and/or defined on a first (top) side of substrate 130 and (ii) portion 432 of lens holder 120 and/or an electrode coupled to portion 432, and capacitor 446 formed by (i) electrode 406 coupled to and/or defined on a second (bottom) side of substrate 130 and (ii) portion 436 of actuator frame 160 and/or an electrode coupled to portion 436.

The capacitance of capacitors 442 and 446 may vary as substrate 130 moves relative to lens assembly 110, and may thus be indicative of a relative position between image sensor 140 and lens assembly 110. Specifically, the capacitance of capacitor 442 may increase as substrate 130 moves up and towards lens holder 120 and decrease as substrate 130 moves down and away from the lens holder 120, while the capacitance of capacitor 446 may increase as substrate 130 moves down and towards actuator frame 160 and decrease as substrate 130 moves up and away from actuator frame 160.

The capacitive position sensor may also include capacitor 444 formed by (i) electrode 404 coupled to and/or defined on the first (top) side of substrate 130 and (ii) portion 434 of lens holder 120 and/or an electrode coupled to portion 434, and capacitor 448 formed by (i) electrode 408 coupled to and/or defined on the second (bottom) side of substrate 130 and (ii) portion 438 of actuator frame 160 and/or an electrode coupled to portion 438.

In some implementations, electrode 402 may be physically discontinuous with and/or electrically disconnected from electrode 404, portion 432 may be physically discontinuous with and/or electrically disconnected from portion 434, electrode 406 may be physically discontinuous with and/or electrically disconnected from electrode 408, and/or portion 436 may be physically discontinuous with and/or electrically disconnected from portion 438. Accordingly, capacitors 442, 444, 446, and/or 448 may be physically and/or electrically separate from one another, and the respective capacitances thereof may be measured independently.

In other implementations, electrode 402 may be physically continuous with and/or electrically connected to electrode 404, portion 432 may be physically continuous with and/or electrically connected to portion 434, electrode 406 may be physically continuous with and/or electrically connected to electrode 408, and/or portion 436 may be physically continuous with and/or electrically connected to portion 438. Accordingly, capacitor 446 and capacitor 448 may collectively form one capacitor, and capacitor 442 and capacitor 444 may collectively form another capacitor.

The position of substrate 130 (and components connected thereto) may be determined based on a difference between a capacitance measurement of capacitor 442 and a capacitance measurement of capacitor 446, and/or a difference between a capacitance measurement of capacitor 444 and a capacitance measurement of capacitor 448. For example, a z-axis position of a left side of substrate 130 may be determined by subtracting a measured capacitance of capacitor 442 from a measured capacitance of capacitor 446 (i.e., $D_{LEFT}=C_{442}-C_{446}$), and mapping the difference $D_{LEFT}$ therebetween to a corresponding physical distance. Similarly, a z-axis position of a right side of substrate 130 may be determined by subtracting a measured capacitance of capacitor 444 from a measured capacitance of capacitor 448 (i.e., $D_{RIGHT}=C_{444}-C_{448}$), and mapping the difference $D_{RIGHT}$ therebetween to a corresponding physical distance. A z-axis position substrate 130 as a whole may be determined by averaging the position of the left side thereof with the position of the right sides thereof, or directly based on the measured capacitances (i.e., $D_{OVERALL}=(C_{442}+C_{444})-(C_{446}+C_{448})$).

The differential capacitive position sensing architecture of FIG. 4B may provide several improvements over the architecture of FIG. 4A. For example, the differential capacitive position sensing architecture of FIG. 4B may (i) reduce and/or minimize a sensitivity of the capacitive position sensor to sources of common mode noise (e.g., noise experienced equally by capacitors 442 and 446) including temperature, humidity, and component aging, (ii) reduce parasitic loading on electronic components associated with the capacitive position sensor, (iii) improve linearity and reduce gain error of the capacitive position sensor, and (iv) increase the sensitivity and/or resolution of the capacitive position sensor.

The capacitive position sensors described herein may be configured to measure the position of substrate 130 along optical axis 114, and it may be desirable to reduce or minimize a sensitivity of the capacitive position sensor to displacements in directions perpendicular to optical axis 114. Accordingly, an area of the capacitive plate coupled to and/or formed by lens assembly 110 (e.g., portions of lens holder 120 and/or actuator frame 160) may exceed an area of a corresponding capacitive plate formed by the electrode coupled to substrate 130. For example, an area of the capacitive plate formed by portion 412 may exceed an area of electrode 402, an area of the capacitive plate formed by portion 414 may exceed an area of electrode 404, an area of the capacitive plate formed by portion 432 may exceed an area of electrode 402, an area of the capacitive plate formed by portion 434 may exceed an area of electrode 404, an area of the capacitive plate formed by portion 436 may exceed an area of electrode 406, and/or an area of the capacitive plate formed by portion 438 may exceed an area of electrode 408.

In example embodiments, a width (e.g., along the x-axis) of the capacitive plate coupled to and/or formed by lens assembly 110 may exceed a width of the corresponding capacitive plate formed by the electrode coupled to substrate 130, thus allowing the resulting capacitor to exhibit no more than a threshold extent of sensitivity to displacements along the x-axis. Additionally and/or alternatively, a length (e.g., along the y-axis) of the capacitive plate coupled to and/or formed by lens assembly 110 may exceed a length of the corresponding capacitive plate formed by the electrode coupled to substrate 130, thus allowing the resulting capacitor to exhibit no more than a threshold extent of sensitivity to displacements along the y-axis.

Figure 4C:
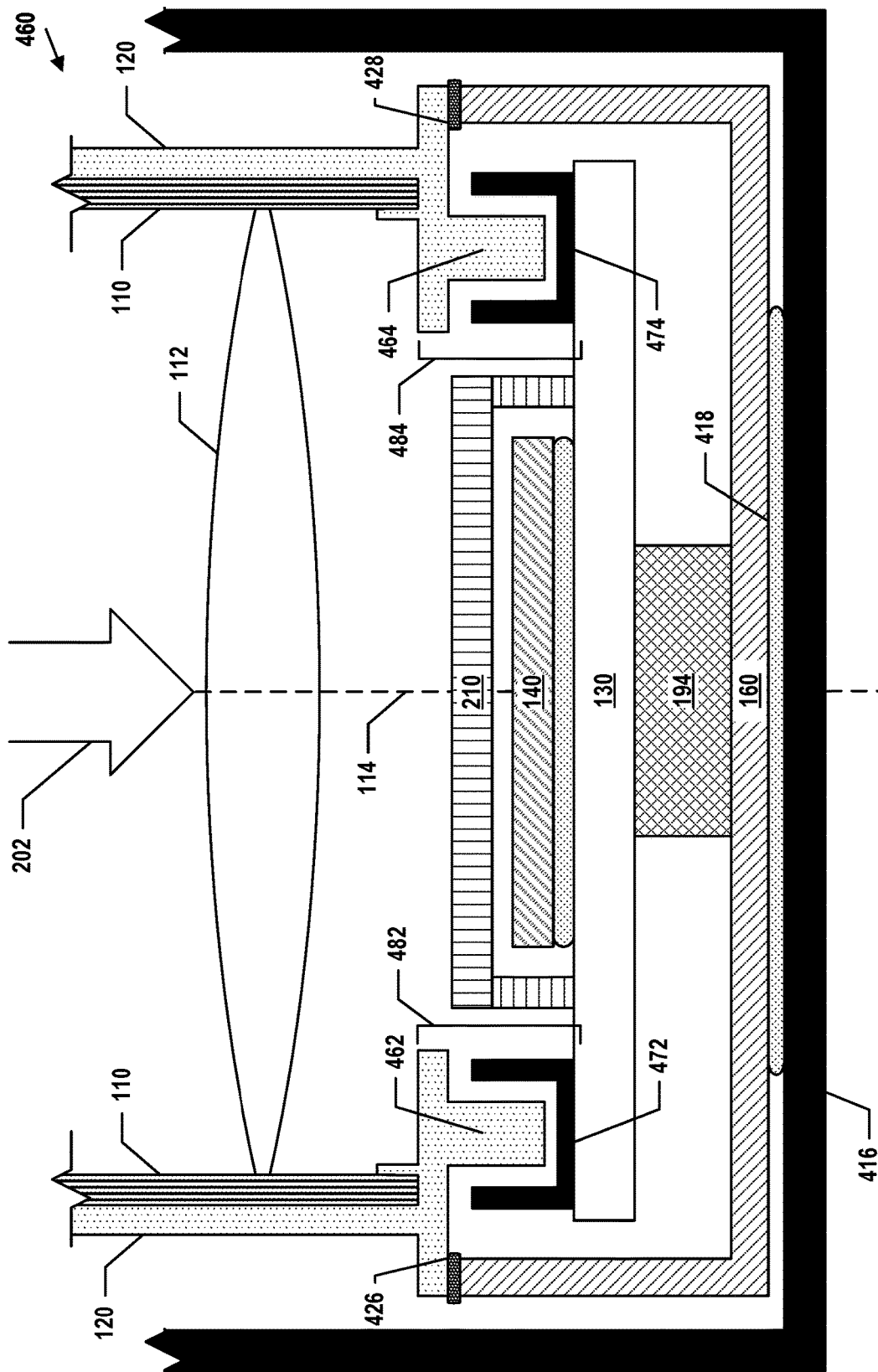
FIG. 4C illustrates an optical system with a tongue-and-groove capacitive position sensor, in accordance with example embodiments.

FIG. 4C illustrates optical system 460. At least some elements of optical system 460 could be similar or identical to the elements of systems 100, 200, 400, and/or 430 (e.g., optical system 460 may include fewer or more elements than systems 100, 200, 400, and/or 430), as illustrated and described in relation to FIGS. 1, 2, 4A, and 4B, and/or could be combined therewith.

Specifically, optical system 460 includes a capacitive position sensor that has a tongue-and-groove arrangement. The capacitive position sensor of optical system 430 may include at least one capacitor formed by a first groove-shaped capacitive plate coupled to and/or defined on substrate 130 and a second tongue-shaped capacitive plate coupled to and/or defined by a portion of lens assembly 110. Specifically, the capacitive position sensor may include capacitor 482 formed by (i) groove electrode 472 coupled to and/or defined on the first (top) side of substrate 130 and (ii) tongue portion 462 of lens holder 120 and/or an electrode coupled to tongue portion 462. The capacitance of capacitor 482 may vary as substrate 130 moves relative to lens assembly 110, and may thus be indicative of a relative position between image sensor 140 and lens assembly 110.

The capacitive position sensor may also include capacitor 484 formed by (i) groove electrode 474 coupled to and/or defined on the first (top) side of substrate 130 and (ii) tongue portion 464 of lens holder 120 and/or an electrode coupled to tongue portion 464. In some implementations, groove electrode 472 may be physically discontinuous with and/or electrically disconnected from groove electrode 474, and tongue portion 462 may be physically discontinuous with and/or electrically disconnected from tongue portion 464. Accordingly, capacitor 482 and capacitor 484 may be physically and/or electrically separate, and the respective capacitances thereof may be measured independently. In other implementations, groove electrode 472 may be physically continuous with and/or electrically connected to groove electrode 474, and tongue portion 462 may be physically continuous with and/or electrically connected to tongue portion 464. Accordingly, capacitor 482 and capacitor 484 may collectively form a single capacitor.

In some implementations, the tongue-and-groove arrangement of FIG. 4C may be arranged to form a differential capacitor architecture, such as that shown in FIG. 4B. Specifically, at least one additional capacitor may be formed by a groove electrode coupled to the second (bottom) side of substrate 130 (e.g., underneath capacitor 482) and a tongue portion of actuator frame 160.

V. EXAMPLE CAPACITIVE PLATE STRUCTURE

FIGS. 5A and 5B illustrate an example structure of the capacitive plates that may be used in connection with optical systems 400, 430, and/or 460. Specifically, a capacitive plate may include a sensor electrode and a shield electrode. For example, a capacitive plate formed on substrate 130 may include sensor electrode 504, shield electrode 502, and shield electrode 506. Shield electrode 502 may run along a first (left) side of sensor electrode 504, and shield electrode 506 may run along a second (right) side of sensor electrode 504. Accordingly, an electric field of sensor electrode 504 may be "sandwiched" and/or interposed between the respective electric fields of shield electrodes 502 and 504. In some implementations, shielding electrodes 502 and 506 may be located in a different vertical layer of substrate 130 than sensor electrode 504, but may nevertheless be horizontally positioned along the first (left) side of electrode 504 and the second (right) side of sensor electrode 504, respectively. One or more of electrodes 402, 404, 406, 408, 472, and/or 474 may be structured in the manner shown in FIGS. 5A and 5B.

FIG. 5A illustrates shield electrodes 502 and 506 used in a passive manner, while FIG. 5B illustrates shield electrodes 502 and 506 used in an active manner. Specifically, as shown in FIG. 5A, shield electrodes 502 and 506 may be grounded, and may thus provide passive shielding to sensor electrode 504. Alternatively, as shown in FIG. 5B, a common signal may be applied to shield electrodes 502 and 506 and to sensor electrode 504, and shield electrodes 502 and 506 may thus provide active shielding to sensor electrode 504. Specifically, active shielding of sensor electrode 504 may direct and/or focus the sensing zone of sensor electrode 504, as indicated by the electric field lines emanating perpendicularly outward from sensor electrode 504 in FIG. 5B. Additionally, active shielding may reduce an extent of environmental interference detected by sensor electrode 504, and reduce and/or eliminate parasitic capacitances. Passive shielding may provide some of the benefits of active shielding, although the magnitude of these benefits may be lower than for active shielding.

Figure 6:
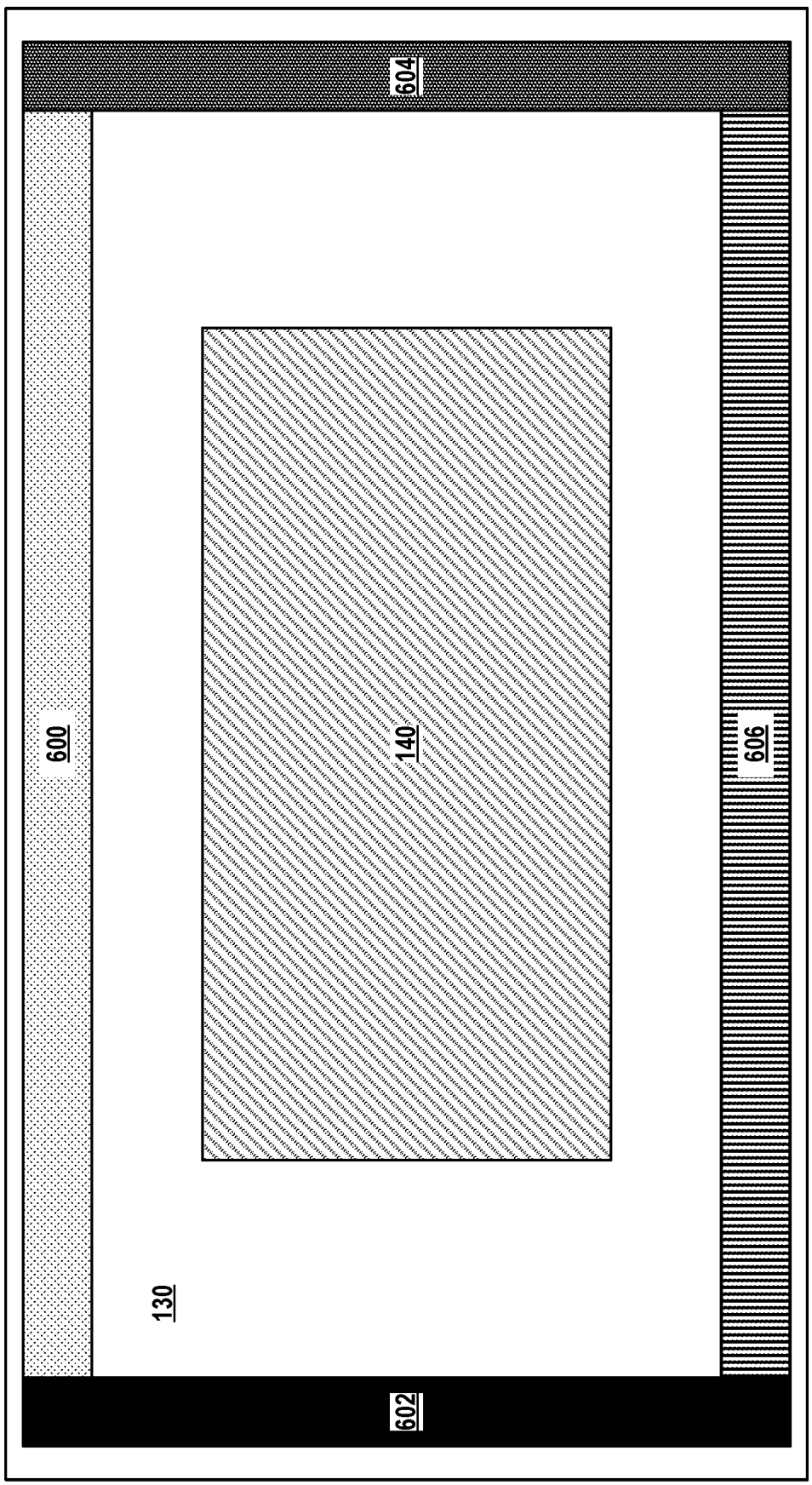
FIG. 6 illustrates a top view of aspects of an optical system, in accordance with example embodiments.

FIG. 6 illustrates an example arrangement of electrodes along the first (top) side of substrate 130 that may be used in connection with optical systems 400, 430, and/or 460. Specifically, substrate 130 may include coupled thereto and/or defined thereon electrodes 600, 602, 604, and 606. Electrodes 602 and 604 may represent electrodes 402 and 404, respectively, shown in FIGS. 4A and 4B, or groove electrodes 472 and 474, respectively, shown in FIG. 4C. Each of electrodes 600, 602, 604, and 606 may be structured as shown in FIGS. 5A and 5B.

Each of electrodes 600, 602, 604, and 606 may span a corresponding portion of a periphery of substrate 130. Specifically, electrode 600 may extend between electrodes 602 and 604 along the x-axis, and may be positioned within a threshold distance of a top portion (as shown in FIG. 6) of the periphery of substrate 130. Electrode 606 may extend between electrodes 602 and 604 along the x-axis, and may be positioned within a threshold distance of a bottom portion (as shown in FIG. 6) of the periphery of substrate 130. Electrode 602 may extend between electrodes 600 and 606 along the y-axis, and may be positioned within a threshold distance of a left portion (as shown in FIG. 6) of the periphery of substrate 130. Electrode 604 may extend between electrodes 600 and 606 along the y-axis, and may be positioned within a threshold distance of a right portion (as shown in FIG. 6) of the periphery of substrate 130.

In some implementations, electrodes 600, 602, 604, and 606 may be electrically connected to one another, and may thus collectively define one capacitive plate. In other implementations, electrodes 600, 602, 604, and 606 may be electrically disconnected from one another, and each electrode may thus define a corresponding capacitive plate that may be used independently of other capacitive plates. Additionally, portions of lens assembly 110 that provide the second capacitive plate for each of electrodes 600, 602, 604, and 606 may, when viewed from the point of view of FIG. 6, have a cross-sectional shape that matches a shape of the corresponding electrode. For example, a length and width of the capacitive plate defined by portion 412 may have a width (along the x-axis) and a length (along the y-axis) that are at least as large as those of electrode 602.

In some implementations, each of electrodes 600, 602, 604, and 606 may have the same area. In some implementations, the shapes of electrodes 600, 602, 604, and/or 606, as well as the shapes of the corresponding capacitive plates formed by portions of lens assembly 110, may have shapes other than shown in FIG. 6. For example, the portions of lens assembly 110 may be irregularly shaped in order to accommodate placement of various components of the optical system within housing 416. Accordingly, electrodes 600, 602, 604, and/or 606 may be formed to match the irregular shape of the corresponding portions of lens assembly 110.

VI. ADDITIONAL EXAMPLE OPERATIONS

Figure 7:
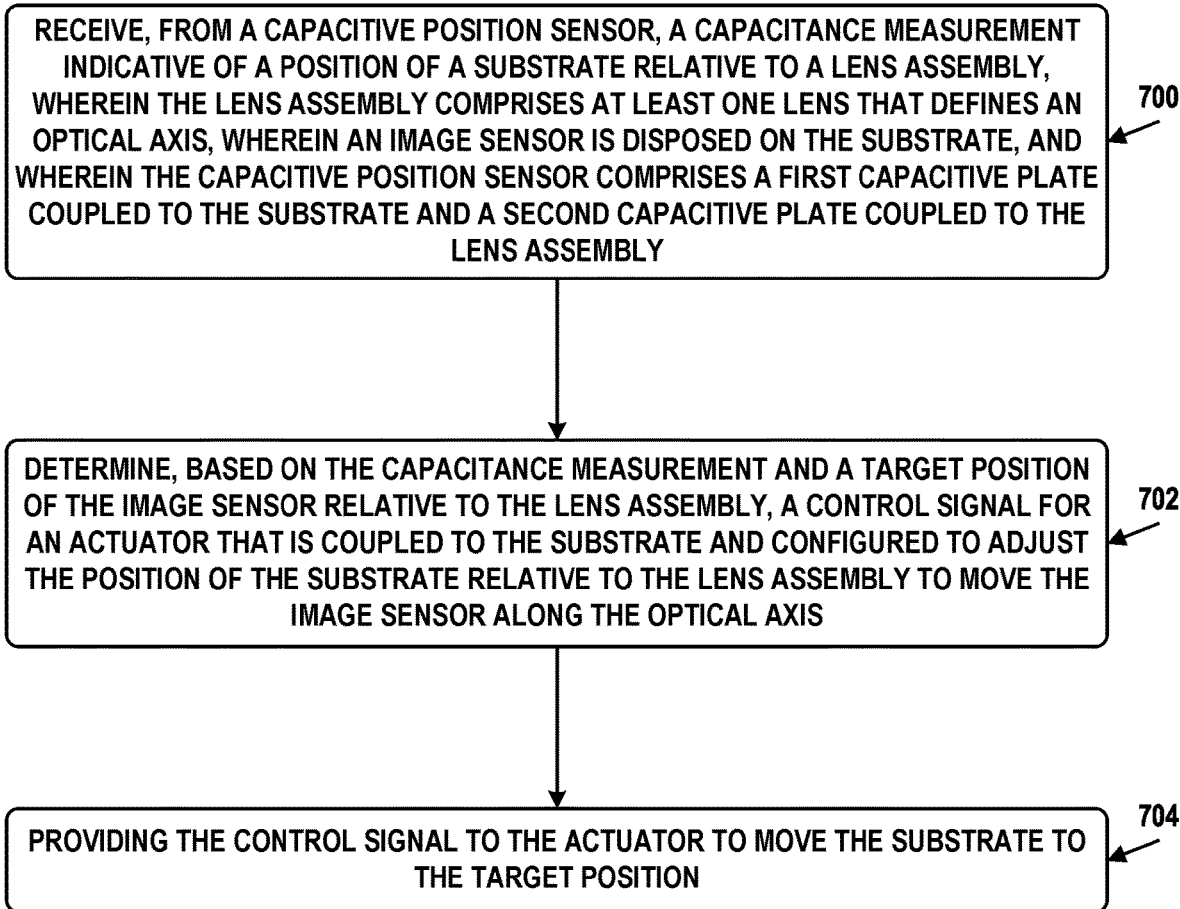
FIG. 7 illustrates a flow chart, in accordance with example embodiments.

FIG. 7 illustrates a flow chart of operations related to controlling a position of an image sensor based on a capacitive position measurement. The operations may be carried out by systems 100, 200, 400, 430, and/or 460, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 may involve receiving, from a capacitive position sensor, a capacitance measurement indicative of a position of a substrate relative to a lens assembly. The lens assembly may include at least one lens that defines an optical axis. An image sensor may be disposed on the substrate. The capacitive position sensor may include a first capacitive plate coupled to the substrate and a second capacitive plate coupled to the lens assembly.

Block 702 may involve determining, based on the capacitance measurement and a target position of the image sensor relative to the lens assembly, a control signal for an actuator. The actuator may be coupled to the substrate and configured to adjust the position of the substrate relative to the lens assembly to move the image sensor along the optical axis.

Block 704 may involve providing the control signal to the actuator to move the substrate to the target position.

In some embodiments, the capacitive position sensor may include (i) a first capacitor that includes the first capacitive plate and the second capacitive plate and (ii) a second capacitor that includes a third capacitive plate and a fourth capacitive plate. The first capacitive plate may be disposed on a first side of the substrate and the second capacitive plate may be disposed on a first portion of the lens assembly that faces and is parallel to the first side of the substrate. The third capacitive plate may be disposed on a second side of the substrate and the fourth capacitive plate may be disposed on a second portion of the lens assembly that faces and is parallel to the second side of the substrate. The first side of the substrate may be opposite to the second side of the substrate.

In some embodiments, the lens assembly may include (i) a lens holder fixedly connected to the at least one lens and (ii) an actuator frame fixedly connected to the lens holder and configured to position the actuator in a fixed position relative to the lens holder. The first portion of the lens assembly may include the lens holder. The second portion of the lens assembly may include the actuator frame.

In some embodiments, determining the control signal for the actuator may include determining a difference signal based on a first capacitance measurement of the first capacitor and a second capacitance measurement of the second capacitor, and determining a position of the substrate relative to the lens assembly based on the difference signal.

In some embodiments, the lens assembly may include (i) a lens holder fixedly connected to the at least one lens and (ii) an actuator frame fixedly connected to the lens holder and configured to position the actuator in a fixed position relative to the lens holder. The capacitive position sensor may include (i) a first capacitor that includes the first capacitive plate and the second capacitive plate and (ii) a second capacitor that includes a third capacitive plate, a dielectric, and a fourth capacitive plate. The first capacitive plate may be disposed on a first side of the substrate and the second capacitive plate may be disposed on a first portion of the lens holder that faces and is parallel to the first side of the substrate. The third capacitive plate may be defined by a second portion of the lens holder, the fourth capacitive plate may be defined by a portion of the actuator frame, and the dielectric may be defined by an adhesive configured to bond the second portion of the lens holder to the portion of the actuator frame and disposed therebetween.

In some embodiments, the first capacitive plate may include a groove defined by a conductive material coupled to a first side of the substrate. The second capacitive plate may include a tongue defined by a first portion of the lens assembly that faces and is parallel to the first side of the substrate. The tongue may be configured to fit in and move relative to the groove.

In some embodiments, the first capacitive plate may include a sensor electrode and one or more shield electrodes adjacent to the sensor electrode.

In some embodiments, the capacitive position sensor may be configured to apply, to the sensor electrode and the one or more shield electrodes, a common signal to define a sensing zone of the sensor electrode.

In some embodiments, a first width of the first capacitive plate may exceed a second width of the second capacitive plate and a first length of the first capacitive plate may exceed a second length of the second capacitive plate such that the capacitance measurement (i) is configured to change in response to motion of the substrate along the optical axis and (ii) exhibits no more than a threshold extent of sensitivity to motion of the substrate perpendicular to the optical axis.

In some embodiments, the first capacitive plate may include a first sensor electrode disposed on a first side of the substrate and extending along a first portion of a periphery of the substrate. The first portion of the periphery may include a first end of the substrate. The first capacitive plate may also include a second sensor electrode disposed on the first side of the substrate and extending along a second portion of the periphery of the substrate. The second portion of the periphery may include a second end of the substrate. The first end may be opposite to the second end.

In some embodiments, the second capacitive plate coupled to the lens assembly may include a conductive portion of the lens assembly. The conductive portion of the lens assembly may be electrically connected to the substrate.

In some embodiments, the target position may be within a depth of focus of the at least one lens.

In some embodiments, image data representing an object in an environment may be obtained from the image sensor. A focus score indicative of an extent of focus associated with the object in the environment may be determined based on the image data. The target position may be determined based on the focus score.

In some embodiments, temperature data may be obtained from a temperature sensor located within a housing that contains the lens assembly and the substrate. The target position may be determined based on the temperature data.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An apparatus comprising:
    a lens assembly comprising at least one lens that defines an optical axis;
    a substrate;
    an image sensor disposed on the substrate;
    an actuator coupled to the substrate and configured to adjust a position of the substrate relative to the lens assembly to move the image sensor along the optical axis;
    a capacitive position sensor comprising (i) a first capacitor comprising a first capacitive plate and a second capacitive plate and (ii) a second capacitor comprising a third capacitive plate and a fourth capacitive plate, wherein:
        the first capacitive plate is coupled to a first side of the substrate and the second capacitive plate is coupled to a first portion of the lens assembly that faces and is parallel to the first side of the substrate,
        the third capacitive plate is coupled to a second side of the substrate and the fourth capacitive plate is coupled to a second portion of the lens assembly that faces and is parallel to the second side of the substrate,
        the first side of the substrate is opposite to the second side of the substrate, and
        the capacitive position sensor is configured to generate a capacitance measurement indicative of the position of the substrate relative to the lens assembly; and
    circuitry configured to control the actuator based on (i) the capacitance measurement and (ii) a target position of the image sensor relative to the lens assembly.

2. The apparatus of claim 1, wherein the second capacitive plate is formed at least in part by the first portion of the lens assembly, and wherein the fourth capacitive plate is formed at least in part by the second portion of the lens assembly.

3. The apparatus of claim 1, wherein the lens assembly comprises (i) a lens holder fixedly connected to the at least one lens and (ii) an actuator frame fixedly connected to the lens holder and configured to position the actuator in a fixed position relative to the lens holder, wherein the first portion of the lens assembly comprises the lens holder, and wherein the second portion of the lens assembly comprises the actuator frame.

4. The apparatus of claim 1, wherein the circuitry is configured to control the actuator by:
    determining a difference signal based on a first capacitance measurement of the first capacitor and a second capacitance measurement of the second capacitor; and
    determining a position of the substrate relative to the lens assembly based on the difference signal.

5. The apparatus of claim 1, wherein the lens assembly comprises (i) a lens holder fixedly connected to the at least one lens and (ii) an actuator frame fixedly connected to the lens holder and configured to position the actuator in a fixed position relative to the lens holder, wherein the capacitive position sensor further comprises a third capacitor comprising a fifth capacitive plate, a dielectric, and a sixth capacitive plate, wherein the second capacitive plate is disposed on a first portion of the lens holder that faces and is parallel to the first side of the substrate, wherein the fifth capacitive plate comprises a second portion of the lens holder, wherein the sixth capacitive plate comprises a portion of the actuator frame, and wherein the dielectric comprises an adhesive configured to bond the second portion of the lens holder to the portion of the actuator frame and disposed therebetween.

6. The apparatus of claim 1, wherein the first capacitive plate comprises a groove defined by a conductive material coupled to a first side of the substrate, wherein the second capacitive plate comprises a tongue defined by the first portion of the lens assembly, and wherein the tongue is configured to fit in and move relative to the groove.

7. The apparatus of claim 1, wherein the first capacitive plate comprises a sensor electrode and one or more shield electrodes adjacent to the sensor electrode.

8. The apparatus of claim 7, wherein the capacitive position sensor is configured to apply, to the sensor electrode and the one or more shield electrodes, a common signal to define a sensing zone of the sensor electrode.

9. The apparatus of claim 1, wherein a first width of the first capacitive plate exceeds a second width of the second capacitive plate and a first length of the first capacitive plate exceeds a second length of the second capacitive plate such that the capacitance measurement (i) is configured to change in response to motion of the substrate along the optical axis and (ii) exhibits no more than a threshold extent of sensitivity to motion of the substrate perpendicular to the optical axis.

10. The apparatus of claim 1, wherein the first capacitive plate comprises:
    a first sensor electrode disposed on a first side of the substrate and extending along a first portion of a periphery of the substrate, wherein the first portion of the periphery comprises a first end of the substrate; and
    a second sensor electrode disposed on the first side of the substrate and extending along a second portion of the periphery of the substrate, wherein the second portion of the periphery comprises a second end of the substrate, wherein the first end is opposite to the second end.

11. The apparatus of claim 1, wherein the second capacitive plate coupled to the first portion of the lens assembly comprises a conductive portion of the lens assembly, wherein the conductive portion of the lens assembly is electrically connected to the substrate.

12. The apparatus of claim 1, wherein the target position is within a depth of focus of the at least one lens.

13. The apparatus of claim 1, wherein the circuitry is further configured to:
    obtain, from the image sensor, image data representing an object in an environment;

determine, based on the image data, a focus score indicative of an extent of focus associated with the object in the environment; and
determine the target position based on the focus score.

14. The apparatus of claim 1, further comprising:
a housing containing the lens assembly and the substrate; and
a temperature sensor located within the housing, wherein the circuitry is further configured to:
obtain, from the temperature sensor, temperature data; and
determine the target position based on the temperature data.

15. A method comprising:
receiving, from a capacitive position sensor, a capacitance measurement indicative of a position of a substrate relative to a lens assembly, wherein the lens assembly comprises at least one lens that defines an optical axis, wherein an image sensor is disposed on the substrate, and wherein the capacitive position sensor comprises (i) a first capacitor comprising a first capacitive plate and a second capacitive plate and (ii) a second capacitor comprising a third capacitive plate and a fourth capacitive plate, wherein:
the first capacitive plate is coupled to a first side of the substrate and the second capacitive plate is coupled to a first portion of the lens assembly that faces and is parallel to the first side of the substrate,
the third capacitive plate is coupled to a second side of the substrate and the fourth capacitive plate is coupled to a second portion of the lens assembly that faces and is parallel to the second side of the substrate, and
the first side of the substrate is opposite to the second side of the substrate;
determining, based on the capacitance measurement and a target position of the image sensor relative to the lens assembly, a control signal for an actuator that is coupled to the substrate and configured to adjust the position of the substrate relative to the lens assembly to move the image sensor along the optical axis; and
providing the control signal to the actuator to move the substrate to the target position.

16. The method of claim 15, wherein the second capacitive plate is formed at least in part by the first portion of the lens assembly, wherein the fourth capacitive plate is formed at least in part by the second portion of the lens assembly, and wherein the method further comprises:
determining a difference signal based on a first capacitance measurement of the first capacitor and a second capacitance measurement of the second capacitor; and
determining a position of the substrate relative to the lens assembly based on the difference signal.

17. The method of claim 15, wherein the first capacitive plate comprises a sensor electrode and one or more shield electrodes adjacent to the sensor electrode, and wherein the method further comprises:
applying, to the sensor electrode and the one or more shield electrodes, a common signal to define a sensing zone of the sensor electrode.

18. The method of claim 15, further comprising:
obtaining, from the image sensor, image data representing an object in an environment;
determining, based on the image data, a focus score indicative of an extent of focus associated with the object in the environment; and
determining the target position based on the focus score.

19. The method of claim 15, further comprising:
obtaining, from a temperature sensor, temperature data, wherein the temperature sensor is located within a housing that contains the lens assembly and the substrate; and
determining the target position based on the temperature data.

20. A system comprising:
a lens assembly comprising: (i) at least one lens that defines an optical axis, (ii) a lens holder fixedly connected to the at least one lens, and (iii) an actuator frame fixedly connected to the lens holder;
a substrate;
an image sensor disposed on the substrate;
an actuator coupled to the substrate and configured to adjust a position of the substrate relative to the lens assembly to move the image sensor along the optical axis, wherein the actuator is positioned by the actuator frame in a fixed position relative to the lens holder;
a capacitive position sensor comprising (i) a first capacitor comprising a first capacitive plate and a second capacitive plate and (ii) a second capacitor comprising a third capacitive plate, a dielectric, and a fourth capacitive plate, wherein:
the first capacitive plate is coupled to a first side of the substrate and the second capacitive plate is coupled to a first portion of the lens holder that faces and is parallel to the first side of the substrate,
the third capacitive plate comprises a second portion of the lens holder,
the fourth capacitive plate comprises a portion of the actuator frame,
the dielectric comprises an adhesive configured to bond the second portion of the lens holder to the portion of the actuator frame and disposed therebetween, and
the capacitive position sensor is configured to generate a capacitance measurement indicative of the position of the substrate relative to the lens assembly; and
circuitry configured to control the actuator based on (i) the capacitance measurement and (ii) a target position of the image sensor relative to the lens assembly.

* * * * *